US012775309B2

(12) United States Patent
Piper et al.

(10) Patent No.: US 12,775,309 B2
(45) Date of Patent: Oct. 27, 2026

(54) CASE WITH KEYBOARD FOR PORTABLE ELECTRONIC DEVICE

(71) Applicant: Pioneer Square Brands, Inc., High Point, NC (US)

(72) Inventors: Brian Lewis Piper, Seattle, WA (US); Sudeep Balkrishna Agalgaonkar, Jamestown, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 117 days.

(21) Appl. No.: 18/766,523

(22) Filed: Jul. 8, 2024

(65) Prior Publication Data

US 2025/0390148 A1 Dec. 25, 2025

Related U.S. Application Data

(60) Provisional application No. 63/662,389, filed on Jun. 20, 2024.

(51) Int. Cl.
*G06F 1/16* (2006.01)

(52) U.S. Cl.
CPC .......... *G06F 1/1669* (2013.01); *G06F 1/1628* (2013.01)

(58) Field of Classification Search
CPC .... G06F 1/1669; G06F 1/1628; G06F 1/1626; G06F 1/1632
See application file for complete search history.

(56) References Cited

U.S. PATENT DOCUMENTS

| | | | | |
|---|---|---|---|---|
| 6,028,764 A * | 2/2000 | Richardson | G09G 5/006 | 361/679.29 |
| 6,530,784 B1 * | 3/2003 | Yim | G06F 1/1679 | 439/31 |
| 9,715,254 B2 * | 7/2017 | Mori | G06F 1/1624 | |
| 10,372,169 B1 * | 8/2019 | Ferren | G06F 1/1628 | |
| 11,294,426 B1 * | 4/2022 | Piper | G06F 1/1669 | |
| 2013/0233762 A1 * | 9/2013 | Balaji | B29C 65/7802 | 206/736 |
| 2019/0361503 A1 * | 11/2019 | Kuriyama | G06F 1/1654 | |
| 2024/0036610 A1 * | 2/2024 | Perelli | G06F 1/1616 | |

* cited by examiner

*Primary Examiner* — Sagar Shrestha
(74) *Attorney, Agent, or Firm* — Grandview Law

(57) ABSTRACT

Systems and methods are involved with (I) a case assembly including a first side including at least one distal wall portion, and at least one proximal wall portion, and a second side including at least one distal wall portion, and at least one proximal wall portion; and (II) a keyboard assembly including a first side removably couplable to the at least one distal wall portion of the first side of the case assembly, and a third side extending perpendicular to the base and extending perpendicular to the second side, the third side removably couplable to the at least one distal wall portion of the third side of the case assembly. In addition, other aspects are described in the claims, drawings, and text forming a part of the present disclosure.

9 Claims, 30 Drawing Sheets

CASE WITH KEYBOARD FOR PORTABLE ELECTRONIC DEVICE

SUMMARY

In one or more aspects, a system for a portable electronic device can include, but is not limited to, (I) a case assembly including (A) a base, (B) a first side extending perpendicular to the base, the first side including at least one distal wall portion, at least one middle wall portion, and at least one proximal wall portion, wherein the at least one distal wall portion is farther from the base than the at least one proximal wall portion is from the base, wherein the at least one middle wall portion is between the at least one distal wall portion and the at least one proximal wall portion, (C) a second side extending perpendicular to the base and extending perpendicular to the first side, (D) a third side extending perpendicular to the base and extending perpendicular to the second side, the third side including at least one distal wall portion, at least one middle wall portion, and at least one proximal wall portion, wherein the at least one distal wall portion is farther from the base than the at least one proximal wall portion is from the base, wherein the at least one middle wall portion is between the at least one distal wall portion and the at least one proximal wall portion, and (E) a fourth side extending perpendicular to the base and extending perpendicular to the first side; and (II) a keyboard assembly including (A) a base, (B) a first side extending perpendicular to the base, the first side removably couplable to the at least one distal wall portion of the first side of the case assembly, (C) a second side extending perpendicular to the base and extending perpendicular to the first side, (D) a third side extending perpendicular to the base and extending perpendicular to the second side, the third side removably couplable to the at least one distal wall portion of the third side of the case assembly, and (E) a fourth side extending perpendicular to the base and extending perpendicular to the first side. In implementations the first side includes at least one portable electronic device support portion of the first side extending perpendicular to the at least one middle wall portion, and wherein the third side includes at least one portable electronic device support portion of the third side extending perpendicular to the at least one middle wall portion.

In implementations the first side includes at least one portable electronic device support portion of the first side extending perpendicular to the at least one middle wall portion, and wherein the third side includes at least one portable electronic device support portion of the third side extending perpendicular to the at least one middle wall portion.

In implementations the first side includes at least one portable electronic device support portion of the first side extending perpendicular to the at least one middle wall portion, and wherein the third side includes at least one portable electronic device support portion of the third side extending perpendicular to the at least one middle wall portion.

In implementations the at least one keyboard support portion of the first side is closer to the at least one distal wall portion of the first side than the at least one portable electronic device support portion of the first side is to the at least one distal wall portion of the first side, and wherein the at least one keyboard support portion of the third side is closer to the at least one distal wall portion of the third side than the at least one portable electronic device support portion of the third side is to the at least one distal wall portion of the third side.

In implementations the at least one keyboard support portion of the first side is a flexible material, and wherein the at least one keyboard support portion of the third side is a flexible material.

In implementations the at least one middle wall portion of the first side is removably couplable with the portable electronic device, and wherein the at least one middle wall portion of the third side is removably couplable with the portable electronic device.

In implementations the first side of the keyboard assembly is frictionally couplable to the at least one distal wall portion of the first side of the case assembly, and wherein the third side of the keyboard assembly is frictionally couplable to the at least one distal wall portion of the third side of the case assembly.

In implementations the first side of the keyboard includes at least one protrusion that is removably couplable to the at least one distal wall portion of the first side of the case assembly, and wherein the third side of the keyboard includes at least one protrusion that is removably couplable to the at least one distal wall portion of the third side of the case assembly.

In implementations the at least one distal wall portion of the first side of the case assembly includes at least one protrusion that is removably couplable to the first side of the keyboard assembly, and wherein the at least one distal wall portion of the third side of the case assembly includes at least one protrusion that is removably couplable to the third side of the keyboard assembly.

In implementations the first side of the keyboard includes at least one protrusion, wherein the at least one distal wall portion of the first side of the case assembly includes at least one protrusion, wherein the at least one protrusion of the first side of the keyboard is removably couplable with the at least one protrusion of the at least one distal wall portion of the first side of the case assembly, wherein the third side of the keyboard includes at least one protrusion, wherein the at least one distal wall portion of the third side of the case assembly includes at least one protrusion, and wherein the at least one protrusion of the third side of the keyboard is removably couplable with the at least one protrusion of the at least one distal wall portion of the third side of the case assembly.

In implementations the case assembly includes at least one semi-rigid portion to allow for uncoupling of the portable electronic device from the case assembly when the portable electronic device is coupled to the case assembly.

In implementations the second side of the case assembly includes an interior portion and an exterior portion, wherein the case assembly includes an electrical cable assembly having an electrical connector, wherein the second side of the case assembly includes an aperture from the exterior portion of the second side through the side second to the interior portion of the second side, wherein the electrical cable assembly includes an electrical connector assembly, wherein the electrical connector assembly extends from the exterior portion of the second side through the aperture of second side to extend past the interior portion of the second side, wherein a portion of the electrical cable assembly extends along the exterior portion of the second side, wherein a portion of the electrical cable assembly extends along the interior portion of the second side, wherein the third side of the case assembly includes an interior portion, wherein a portion of the electrical cable assembly extends along the interior portion of the third side, and wherein the electrical cable assembly is electrically coupled to the keyboard assembly.

In implementations the third side of the case assembly includes an exterior portion with a stylus-shaped recess.

In implementations the flexible hinge is coupled to the case assembly, and wherein the flexible hinge is coupled to the keyboard assembly.

In one or more aspects, a system for a portable electronic device can include, but is not limited to, (I) a case assembly including (A) a base, (B) a first side extending perpendicular to the base, the first side including at least one distal wall portion, and at least one proximal wall portion, and wherein the at least one distal wall portion is farther from the base than the at least one proximal wall portion is from the base, and (C) a second side extending perpendicular to the base and extending parallel with the first side, the second side including at least one distal wall portion, and at least one proximal wall portion, wherein the at least one distal wall portion is farther from the base than the at least one proximal wall portion is from the base; and (II) a keyboard assembly including (A) a base, (B) a first side extending perpendicular to the base, the first side removably couplable to the at least one distal wall portion of the first side of the case assembly, wherein the first side of the keyboard includes at least one protrusion that is removably couplable to the at least one distal wall portion of the first side of the case assembly, and (C) a second side extending perpendicular to the base and extending parallel with to the first side, the second side removably couplable to the at least one distal wall portion of the second side of the case assembly, wherein the second side of the keyboard includes at least one protrusion that is removably couplable to the at least one distal wall portion of the second side of the case assembly.

In implementations the first side includes at least one keyboard support portion and at least one portable electronic device support portion, wherein the at least one keyboard support portion of the first side extends perpendicular to the at least one distal wall portion of the first side, wherein the at least one portable electronic device support portion of the first side extends perpendicular to the at least one distal wall portion of the first side, wherein the at least one keyboard support portion of the first side is closer to the at least one distal wall portion of the first side than the at least one portable electronic device support portion of the first side is to the at least one distal wall portion of the first side, wherein the second side includes at least one keyboard support portion and at least one portable electronic device support portion, wherein the at least one keyboard support portion of the second side extends perpendicular to the at least one distal wall portion of the second side, wherein the at least one portable electronic device support portion of the second side extends perpendicular to the at least one distal wall portion of the second side, and wherein the at least one keyboard support portion of the second side is closer to the at least one distal wall portion of the second side than the at least one portable electronic device support portion of the second side is to the at least one distal wall portion of the second side.

In implementations the at least one keyboard support portion of the first side is a flexible material, and wherein the at least one keyboard support portion of the second side is a flexible material.

In one or more aspects, a system for a portable electronic device can include, but is not limited to, (I) a case assembly including (A) a base, (B) a first side extending perpendicular to the base, the first side including at least one distal wall portion, and at least one proximal wall portion, wherein the at least one distal wall portion is farther from the base than the at least one proximal wall portion is from the base, (C) a second side extending perpendicular to the base and extending perpendicular to the first side, and (D) a third side extending perpendicular to the base and extending perpendicular to the first side, the third side including at least one distal wall portion, and at least one proximal wall portion, wherein the at least one distal wall portion is farther from the base than the at least one proximal wall portion is from the base; and (II) a keyboard assembly including (A) a base, (B) a first side extending perpendicular to the base, the first side removably couplable to the at least one distal wall portion of the first side of the case assembly, wherein the distal wall portion of the first side of the case assembly includes at least one protrusion that is removably couplable to the first side of the keyboard assembly, (C) a second side extending perpendicular to the base and extending perpendicular to the first side, and (D) a third side extending perpendicular to the base and extending perpendicular to the second side, the third side removably couplable to the at least one distal wall portion of the third side of the case assembly, wherein the distal wall portion of the third side of the case assembly includes at least one protrusion that is removably couplable to the third side of the keyboard assembly.

In implementations the first side of the keyboard includes at least one protrusion, wherein the at least one protrusion of the first side of the keyboard is removably couplable with the at least one protrusion of the distal wall portion of the first side of the case assembly, wherein the third side of the keyboard includes at least one protrusion, and wherein the at least one protrusion of the third side of the keyboard is removably couplable with the at least one protrusion of the distal wall portion of the third side of the case assembly.

In implementations the second side of the case assembly includes an interior portion and an exterior portion, wherein the case assembly includes an electrical cable assembly having an electrical connector, wherein the second side of the case assembly includes an aperture from the exterior portion of the second side through the side second to the interior portion of the second side, wherein the electrical cable assembly includes an electrical connector assembly, wherein the electrical connector assembly extends from the exterior portion of the second side through the aperture of second side to extend past the interior portion of the second side, wherein a portion of the electrical cable assembly extends along the exterior portion of the second side, wherein a portion of the electrical cable assembly extends along the interior portion of the second side, wherein the third side of the case assembly includes an interior portion, wherein a portion of the electrical cable assembly extends along the interior portion of the third side, and wherein the electrical cable assembly is electrically coupled to the keyboard assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

Figure 1:
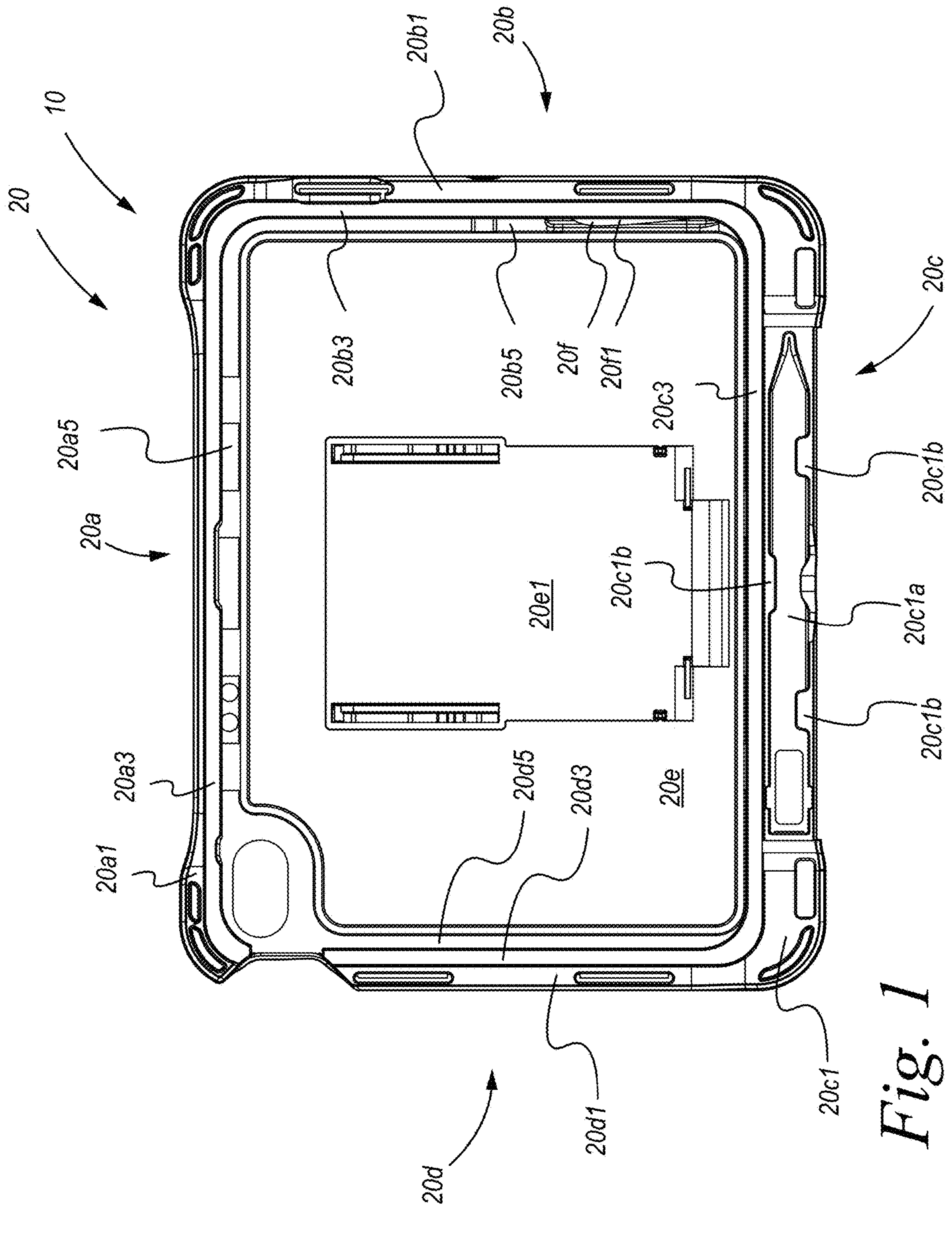
FIG. 1 is a top plan view of a case assembly of a portable electronic device keyboard-case system.

With reference now to the figures, shown are one or more examples of Case with Keyboard for Portable Electronic Computing Device, articles of manufacture, compositions of matter for same that may provide context, for instance, in introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top plan view of case assembly 20 of portable electronic device case system 10. Depicted implementation of case assembly 20 is shown to include side 20*a*, side 20*b*, side 20*c*, side 20*d*, base 20*c*, and electrical cable assembly 20*f*. Depicted implementation of side 20*a* is shown to include exterior surface portion 20*a*1, keyboard support portion 20*a*3, and tablet support portion 20*a*5. Depicted implementation of side 20*b* is shown to include exterior surface portion 20*b*1, keyboard support portion 20*b*3, and tablet support portion 20*b*5. Depicted implementation of side 20*c* is shown to include exterior surface portion 20*c*1 with stylus-shaped recess 20*c*1*a*, tab 20*c*1*b*, and keyboard support portion 20*c*3. Depicted implementation of side 20*d* is shown to include exterior surface portion 20*d*1, keyboard support portion 20*d*3, and tablet support portion 20*d*5. Depicted implementation of base 20*e* is shown to include stand assembly 20*c*1. Depicted implementation of electrical cable assembly 20*f* is shown to include cable mid portion 20*f*1.

Figure 2:
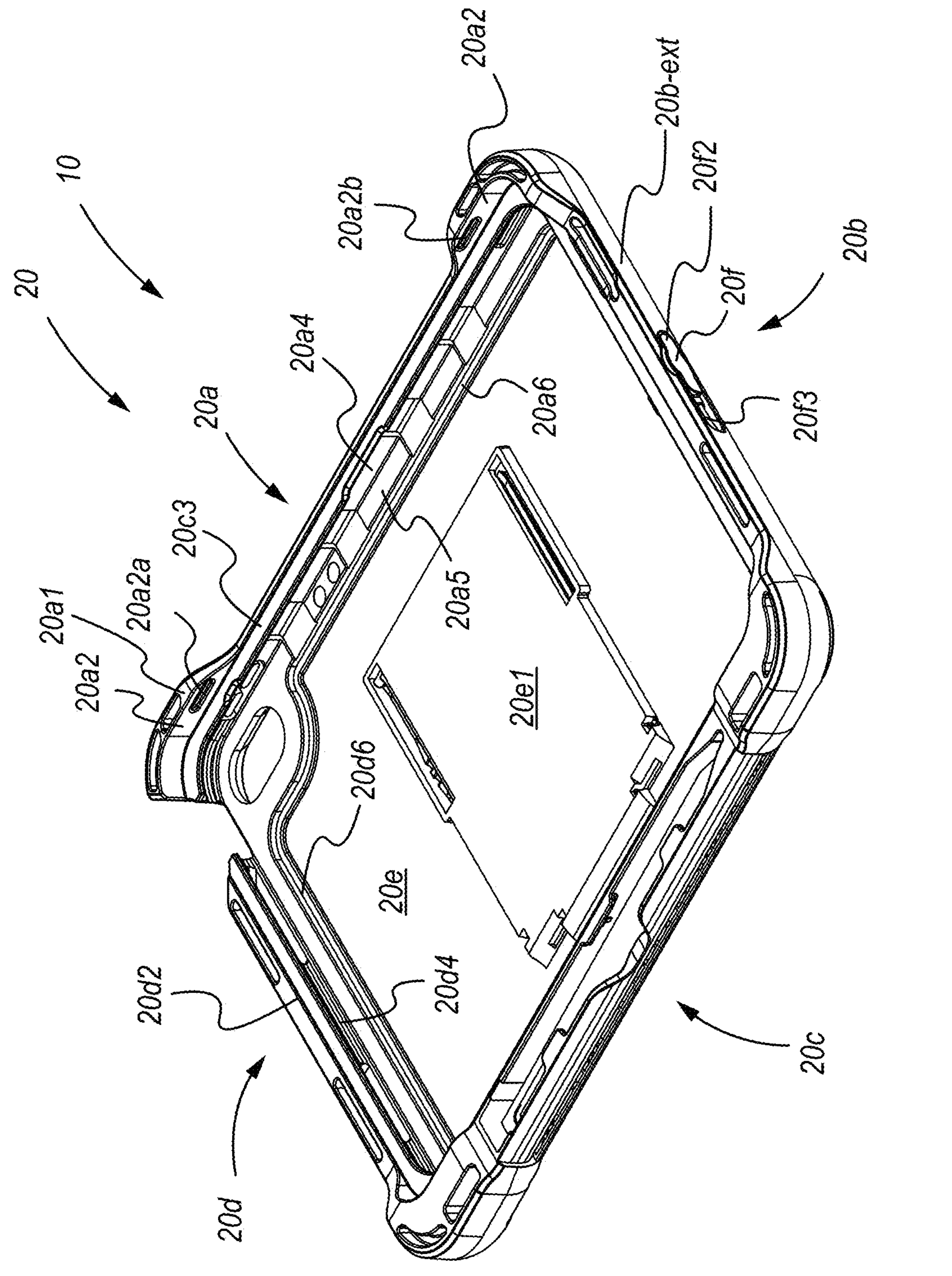
FIG. 2 is a front perspective view of the view of the case assembly of FIG. 1.

Turning to FIG. 2, depicted therein is a front perspective view of the view of case assembly 20. Depicted implementation of side 20*a* is shown to include distal wall portion 20*a*2 with protrusion 20*a*2*a* and protrusion 20*a*2*b*, middle wall portion 20*a*4, and proximal wall portion 20*a*6. Depicted implementation of side 20*b* is shown to include groove 20*b*4*a* and side exterior 20*b*-ext. Depicted implementation of side 20*d* is shown to include distal wall portion 20*d*2, middle wall portion 20*d*4, and proximal wall portion 20*d*6. Depicted implementation of electrical cable assembly 20*f* is shown to include cable end portion 20*f*2 and cable mid portion 20*f*3.

Figure 3:
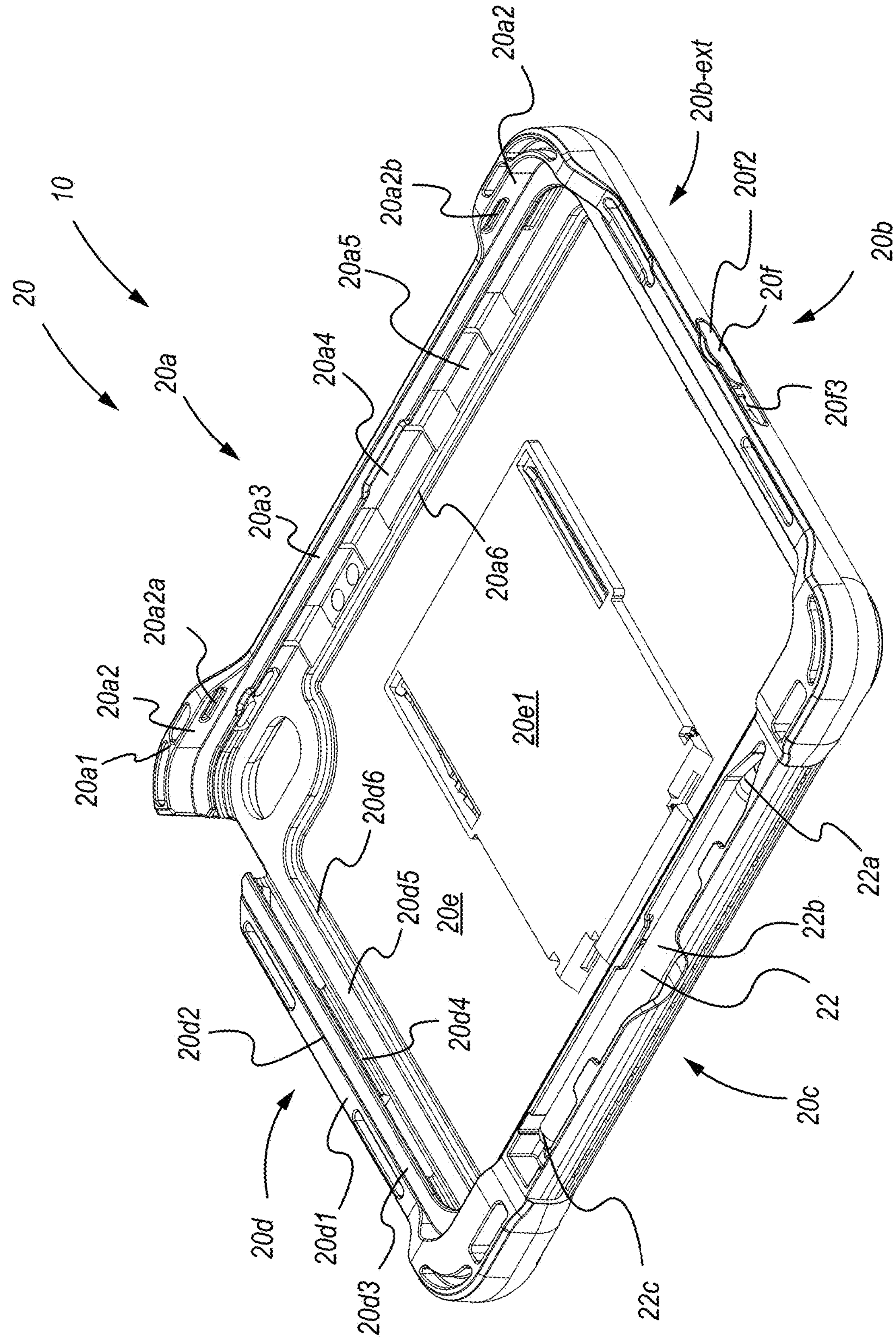
FIG. 3 is a front perspective view of the view of the case assembly of FIG. 1.

Turning to FIG. 3, depicted therein is a front perspective view of the view of case assembly 20. Depicted implementation of side 20*b* is shown to include stylus 22 with tapered end portion 22*a*, middle portion 22*b*, and end portion 22*c*.

Figure 4:
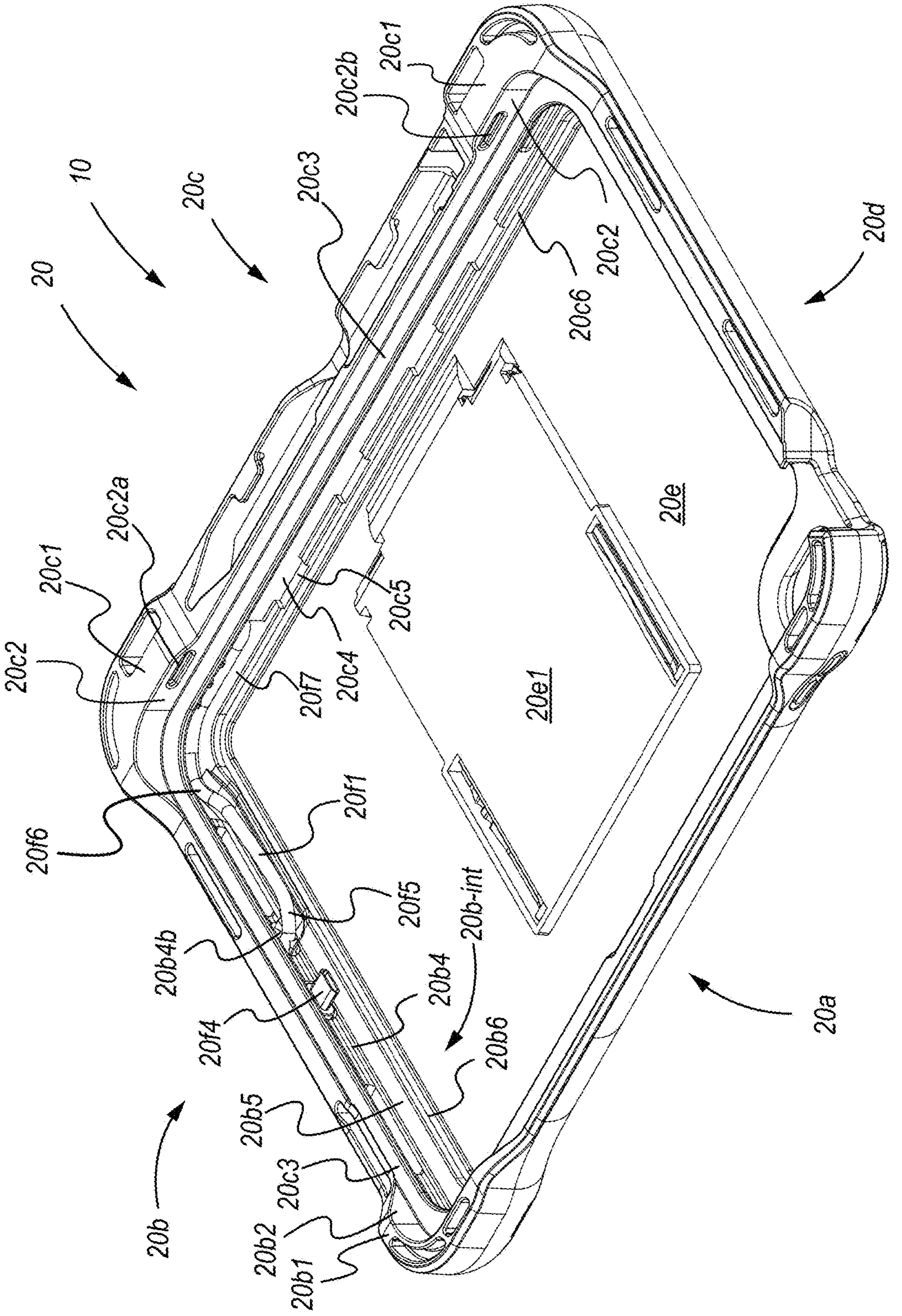
FIG. 4 is a front perspective view of the view of the case assembly of FIG. 1.

Turning to FIG. 4, depicted therein is a front perspective view of the view of case assembly 20. Depicted implementation of side 20*b* is shown to include distal wall portion 20*b*2, middle wall portion 20*b*4 with aperture 20*b*4*b*, tablet support portion 20*b*5, proximal wall portion 20*b*6, and side exterior 20*b*-int. Depicted implementation of side 20*c* is shown to include.) with protrusion 20*c*2*b* and protrusion 20*c*2*a*, middle wall portion 20*c*4, and tablet support portion 20*c*5. Depicted implementation of electrical cable assembly 20*f* is shown to include electrical connector assembly 20*f*4, cable mid portion 20*f*5, cable mid portion 20*f*6, and cable mid portion 20*f*7.

Figure 5:
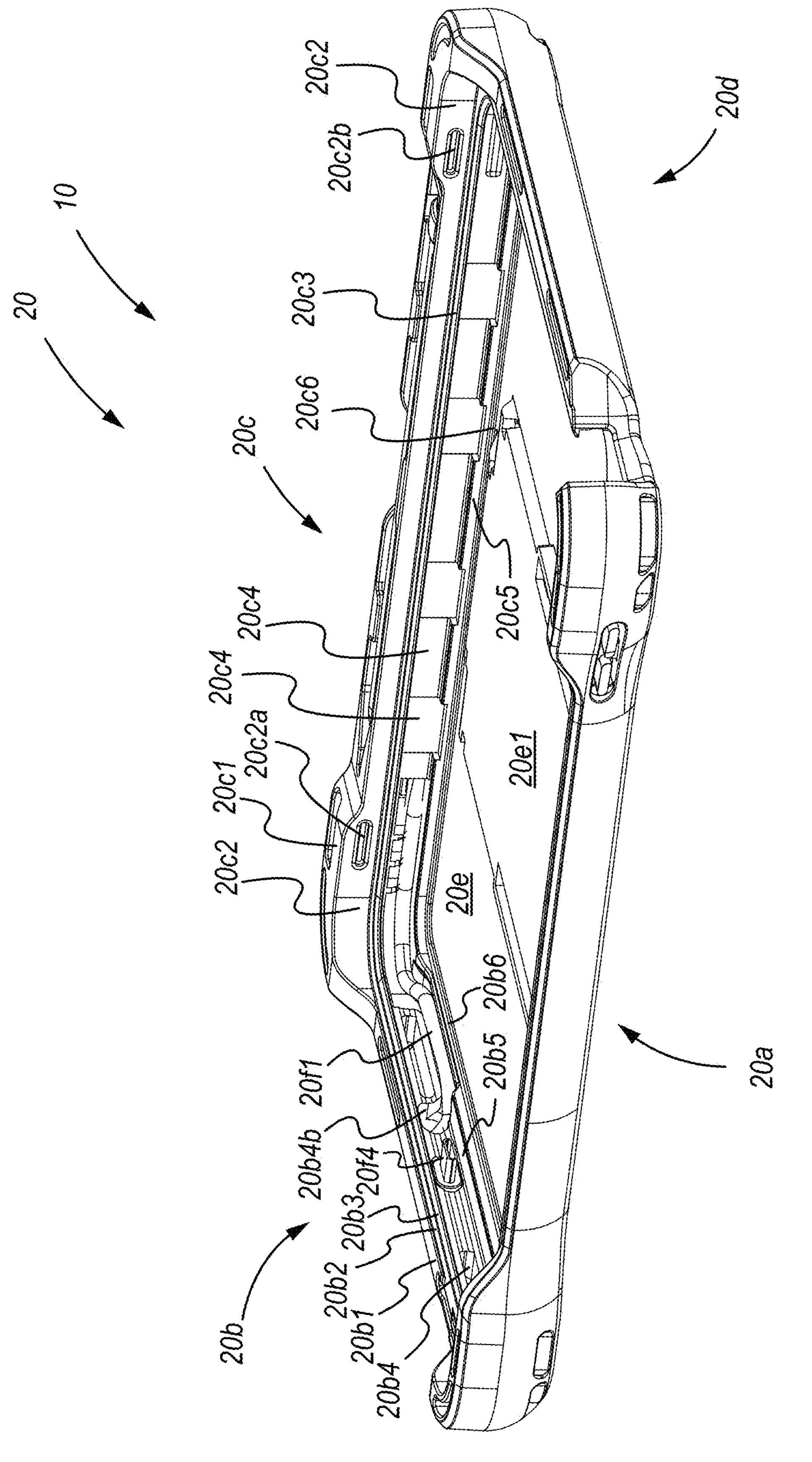
FIG. 5 is a front perspective view of the view of the case assembly of FIG. 1.

Turning to FIG. 5, depicted therein is a front perspective view of the view of case assembly 20.

Figure 6:
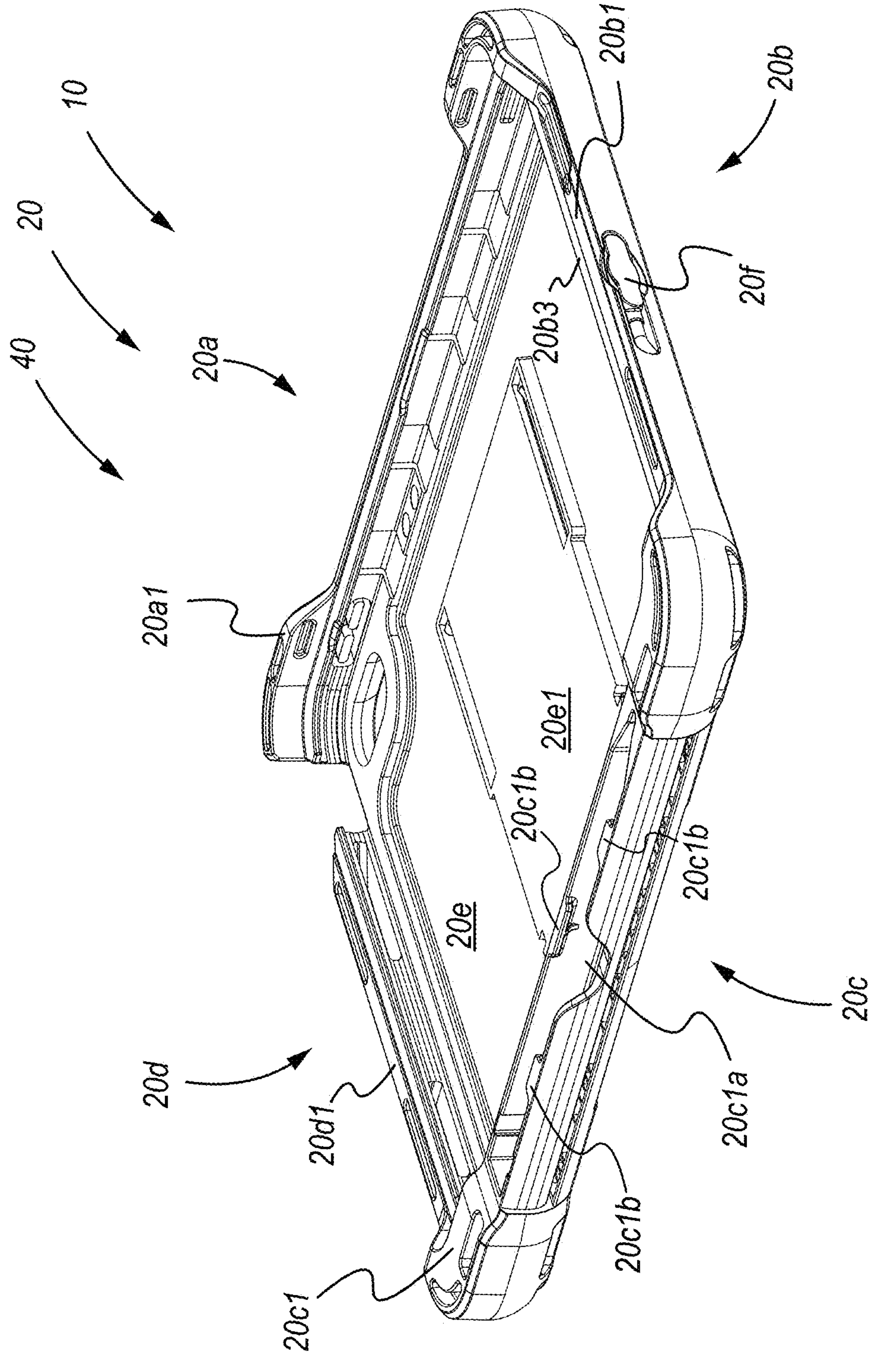
FIG. 6 is a front perspective view of the view of the case assembly of FIG. 1.

Turning to FIG. 6, depicted therein is a front perspective view of the view of case assembly 20.

Figure 7:
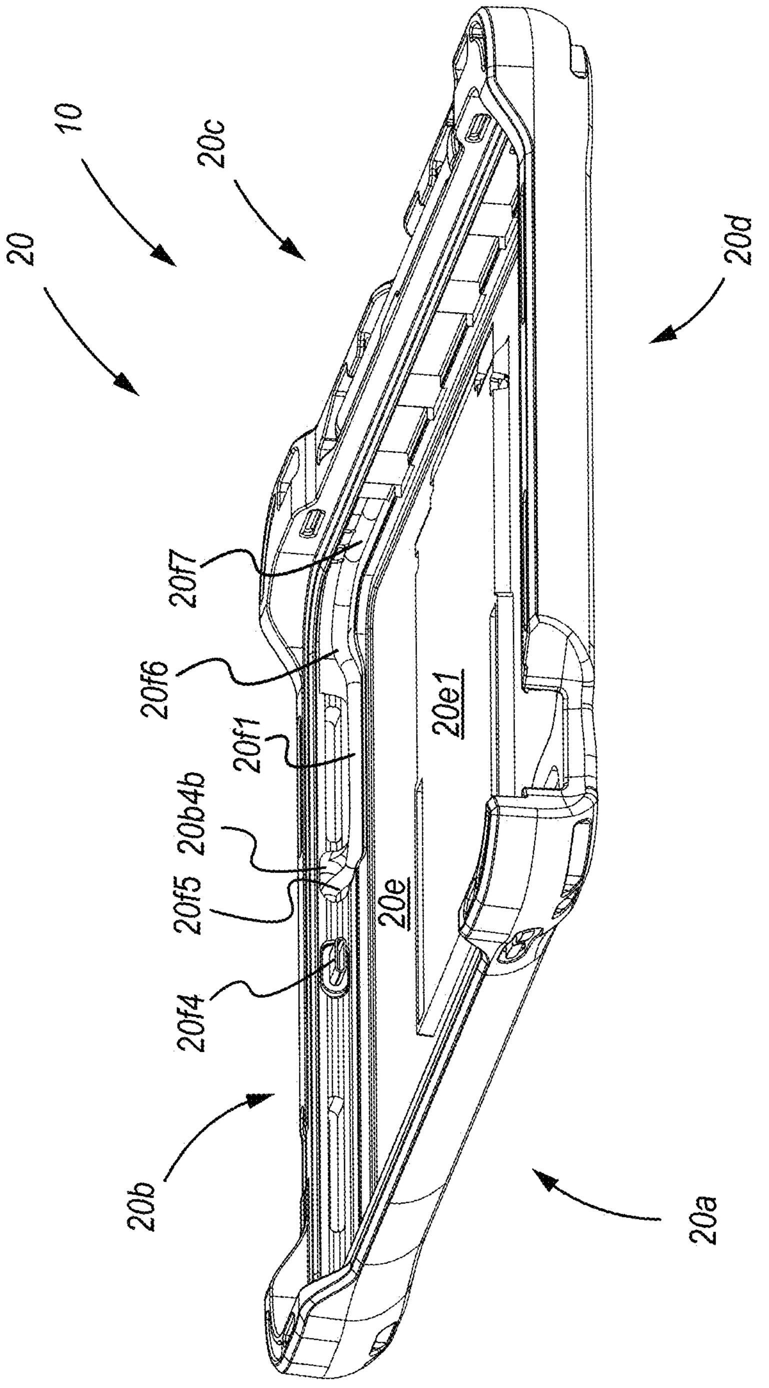
FIG. 7 is a front perspective view of the view of the case assembly of FIG. 1.

Turning to FIG. 7, depicted therein is a front perspective view of the view of case assembly 20.

Figure 8:
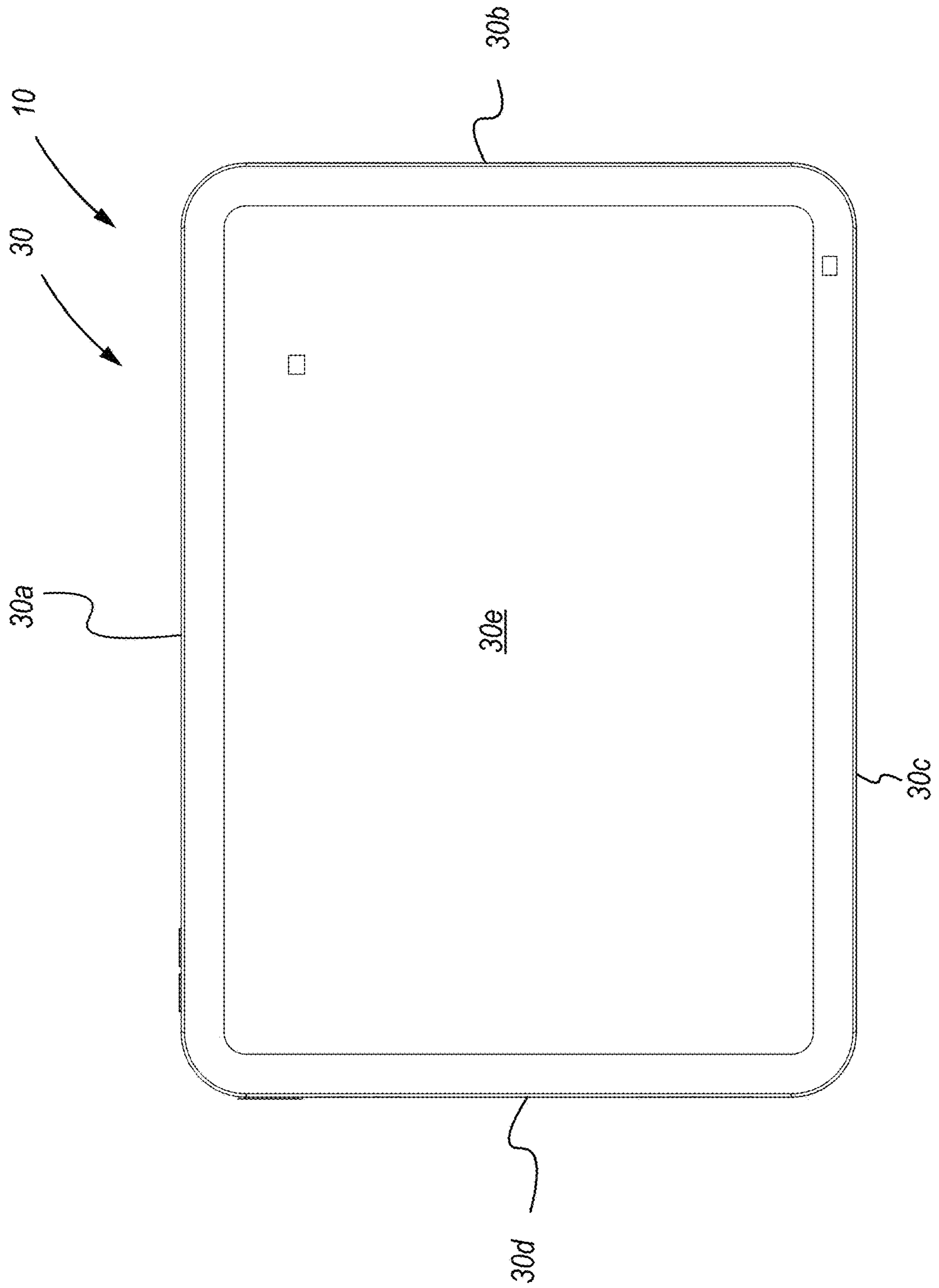
FIG. 8 is a top plan of a portable electronic device.

Turning to FIG. 8, depicted therein is a top plan of portable electronic device 30. Depicted implementation of portable electronic device 30 is shown to include side 30*a*, side 30*b*, side 30*c*, side 30*d*, and display 30*e*. In implementations keyboard support portion 20*a*3, keyboard support portion 20*b*3, keyboard support portion 20*c*3, or keyboard support portion 20*d*3 are made from a flexible plastic, etc. to allow for insertion and removal of portable electronic device 30. In implementations side 20*a*, side 20*b*, side 20*c*, side 20*d*, or base 20*e* of case assembly 20 are sufficiently semi-rigid to allow for insertion and removal of portable electronic device 30.

Figure 9:
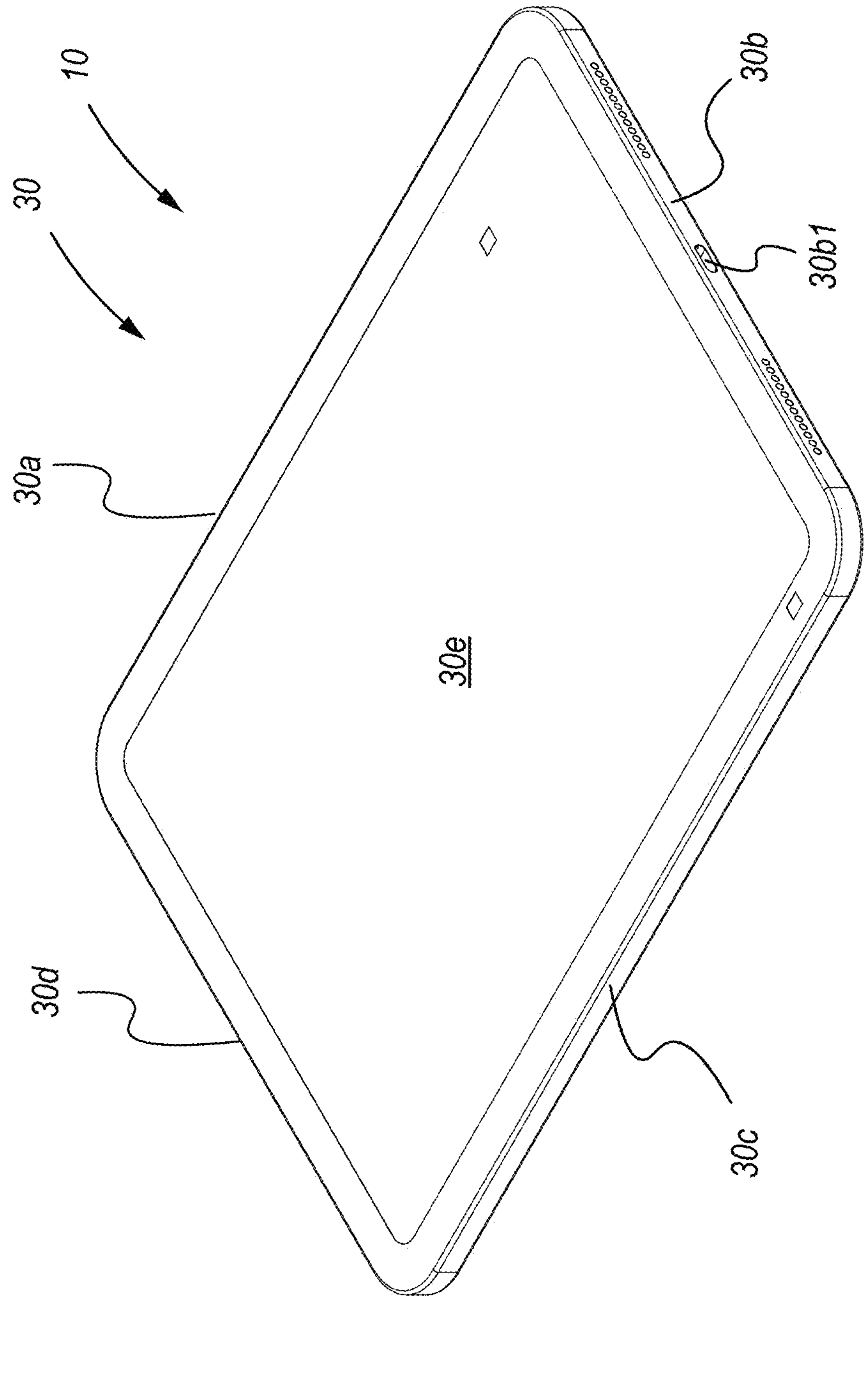
FIG. 9 is a front perspective view of a portable electronic device.

Turning to FIG. 9, depicted therein is a front perspective view of portable electronic device 30. In implementations portable electronic device 30 is removably couplable (e.g., frictionally couplable, etc.) with case assembly 20. Depicted implementation of side 30*b* is shown to include electrical port 30*b*1.

Figure 10:
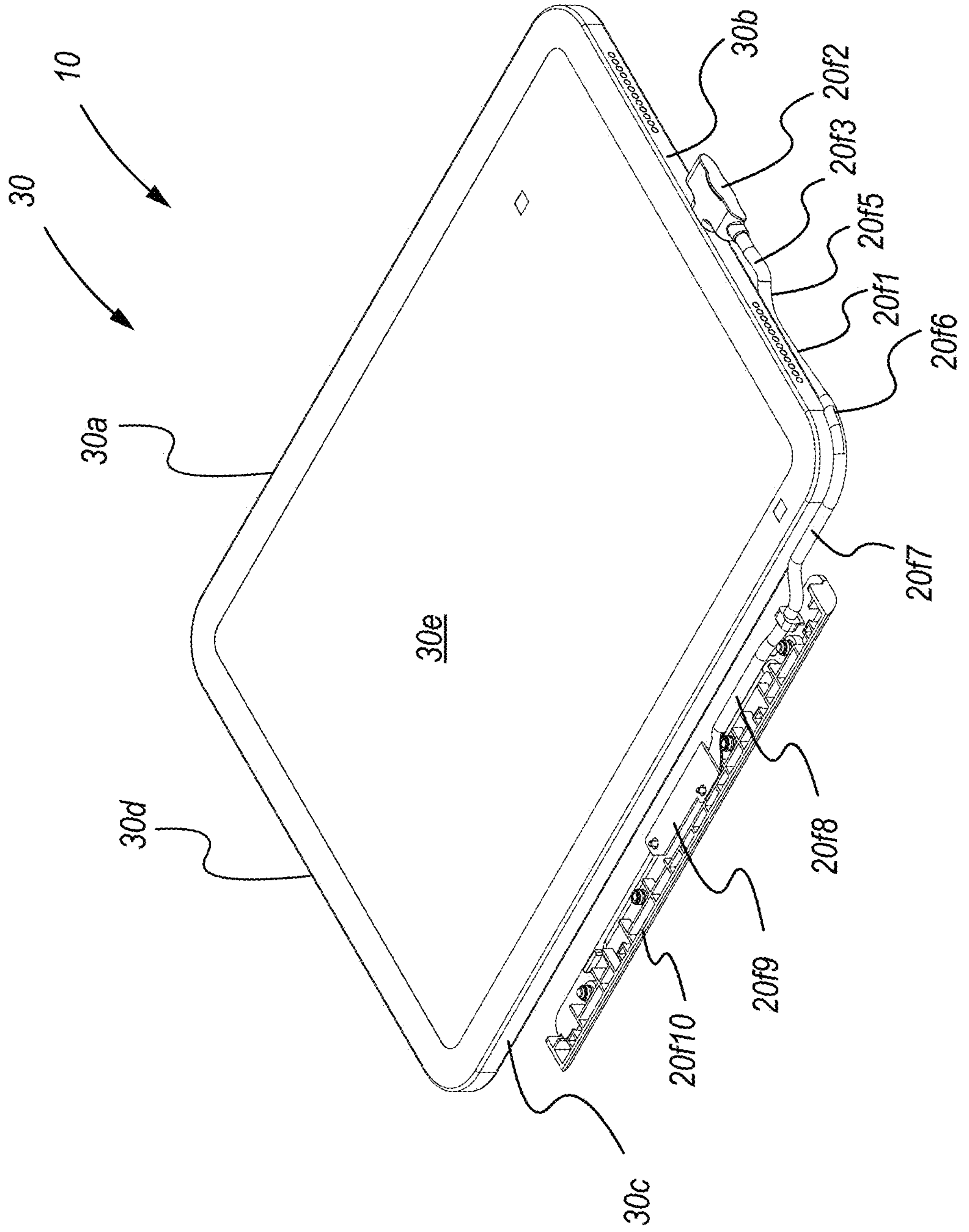
FIG. 10 is a front perspective view of the portable electronic device of FIG. 9 with a cable assembly.

Turning to FIG. 10, depicted therein is a front perspective view of portable electronic device 30 with electrical cable assembly 20*f*. Depicted implementation of electrical cable assembly 20*f* is shown to include end cable portion 20*f*8, coupler bracket 20*f*9, and coupler bracket 20*f*10.

Figure 11:
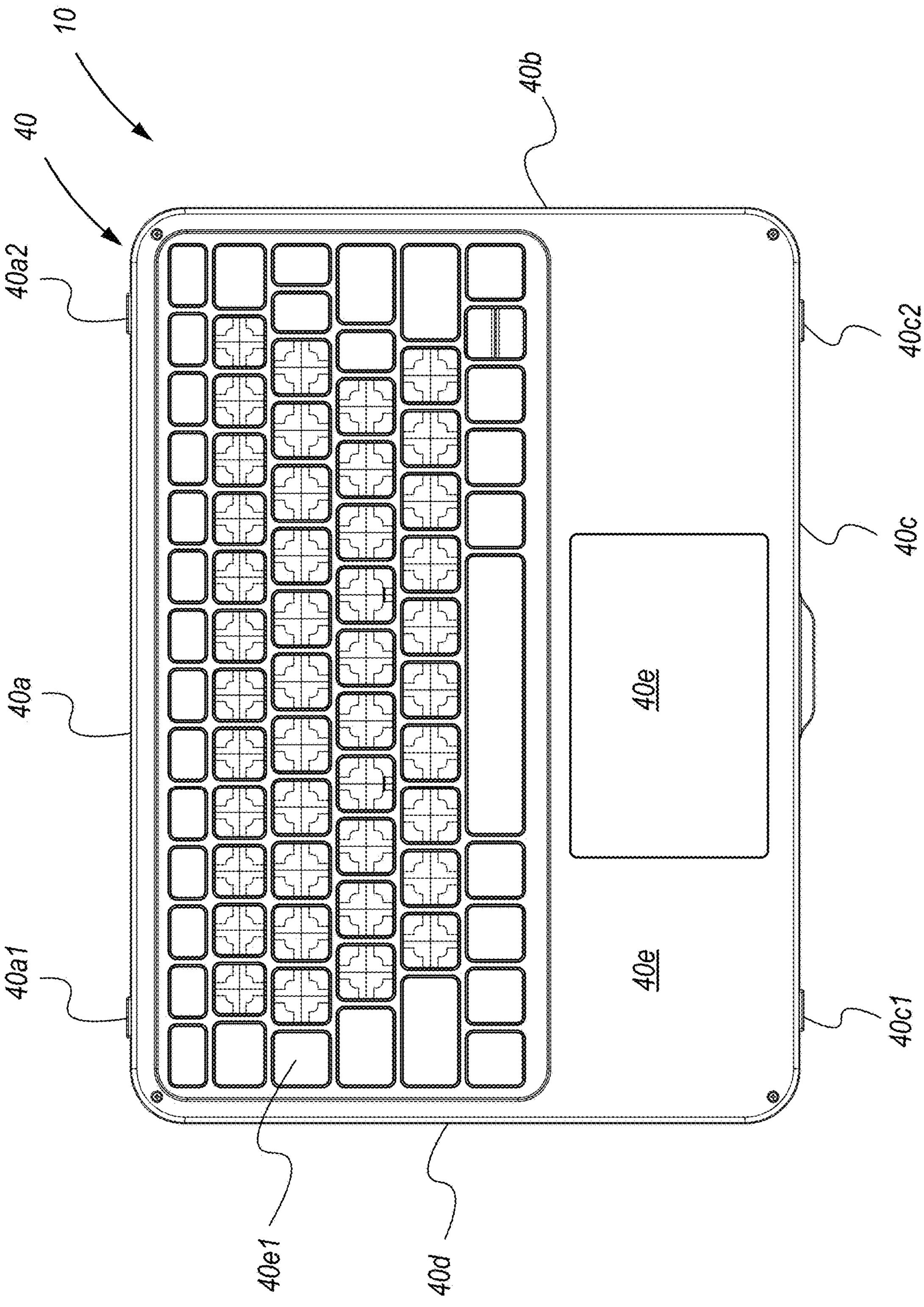
FIG. 11 is a top plan view of a keyboard assembly of the portable electronic device keyboard-case.

Turning to FIG. 11, depicted therein is a top plan view of keyboard assembly 40 of portable electronic device case system 10. Depicted implementation of keyboard assembly 40 is shown to include side 40*a*, side 40*b*, side 40*c*, side 40*d*, and base 40*e*. In implementations keyboard assembly 40 is removably couplable (e.g., frictionally couplable, etc.) with case assembly 20. Depicted implementation of side 40*a* is shown to include protrusion 40*al* and protrusion 40*a*2, which removably couple (e.g., by friction fit, click fit, force fit, etc.) with protrusion 20*c*2*b* and protrusion 20*c*2*a*, respectively. Depicted implementation of side 40*c* is shown to include protrusion 40*c*1 and protrusion 40*c*2 which removably couple (e.g., by friction fit, click fit, force fit, etc.) with protrusion 20*a*2*a* and protrusion 20*a*2*b*, respectively. Depicted implementation of base 40*e* is shown to include keys 40*e*1 and track pad 40*e*2.

Figure 12:
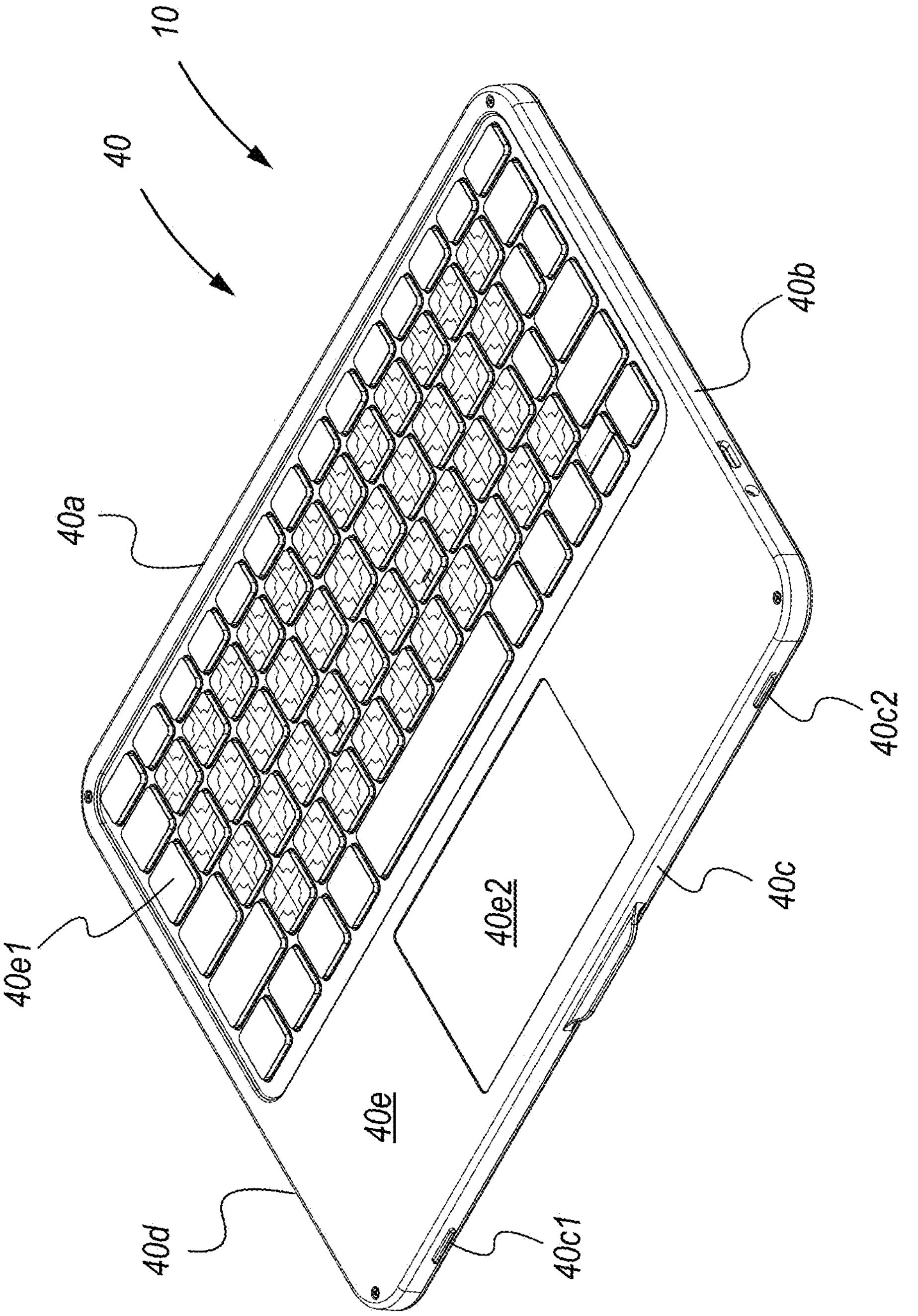
FIG. 12 is a front perspective view of the keyboard assembly of FIG. 12.

Turning to FIG. 12, depicted therein is a front perspective view of keyboard assembly 40.

Figure 13:
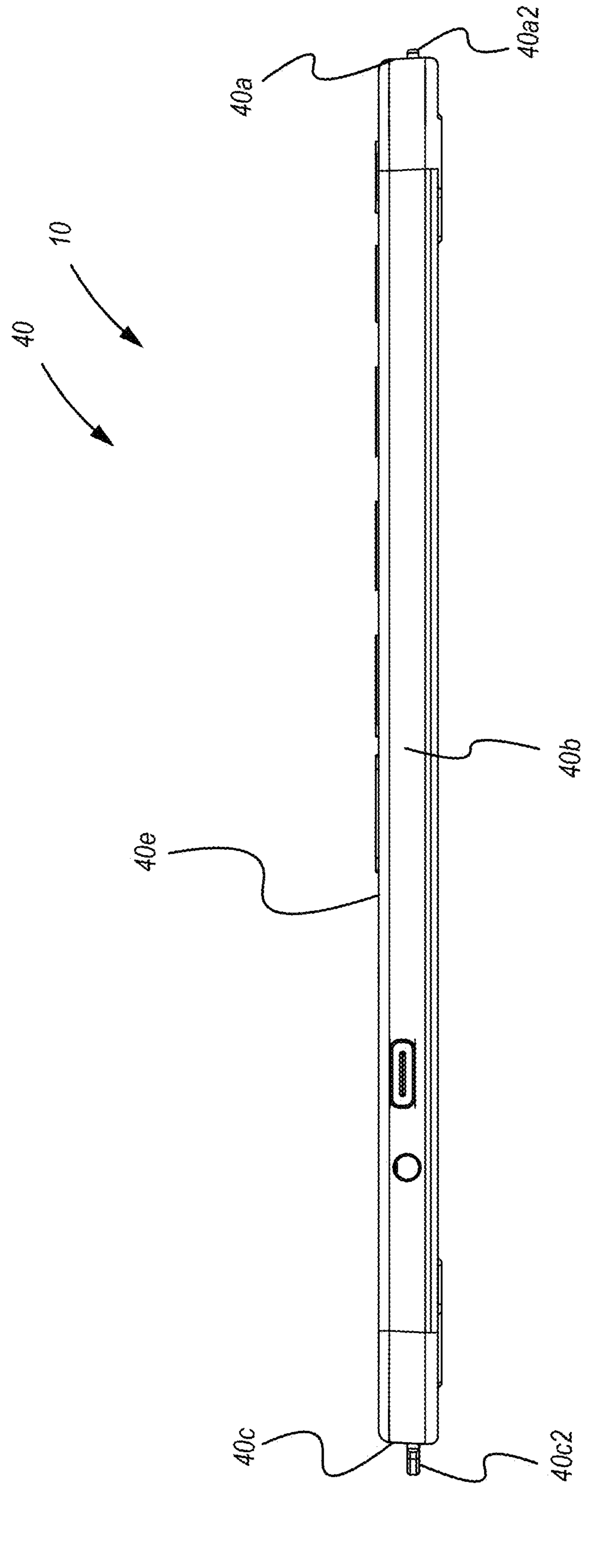
FIG. 13 is a side elevational view of the keyboard assembly of FIG. 12.

Turning to FIG. 13, depicted therein is a side elevational view of keyboard assembly 40.

Figure 14:
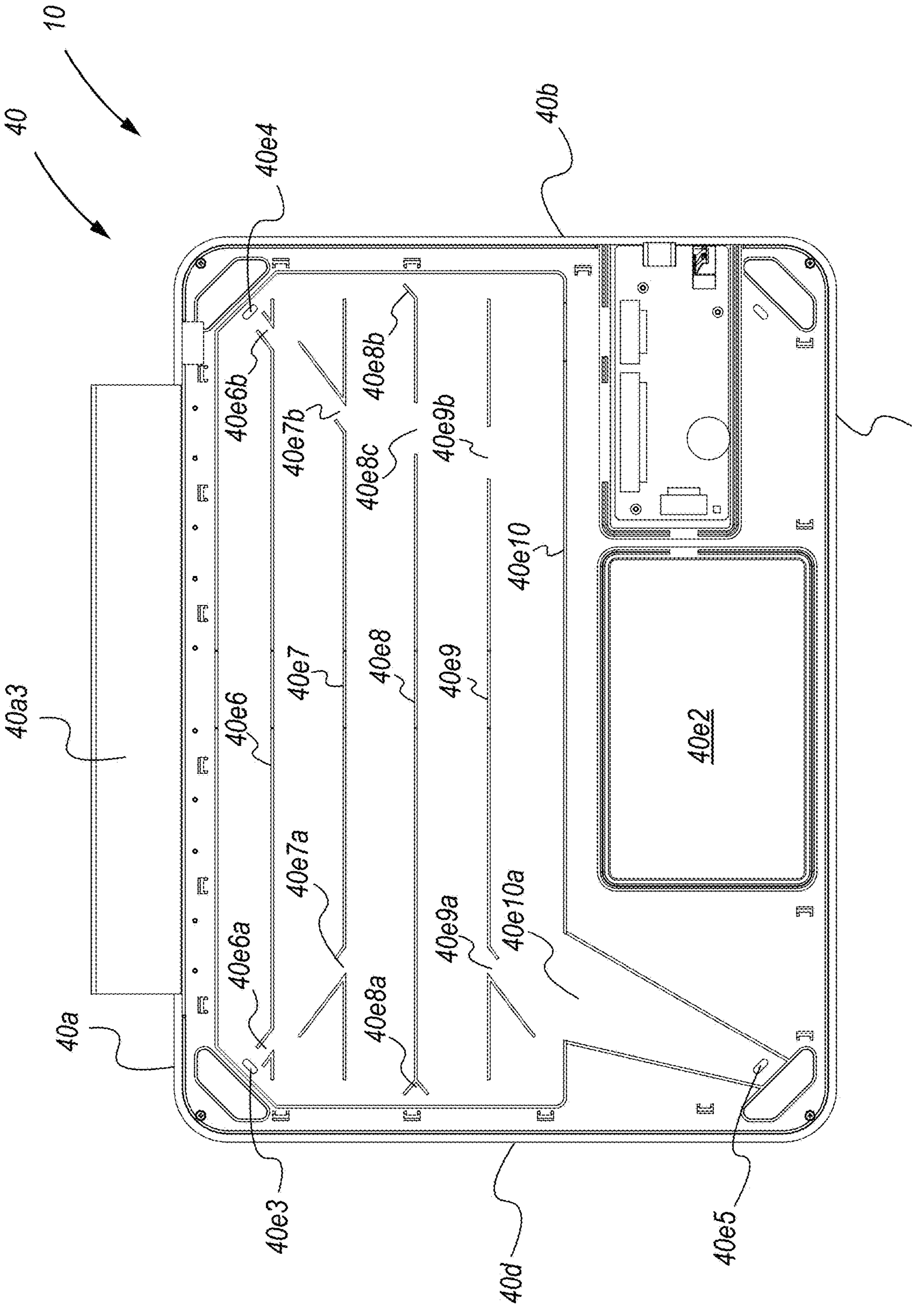
FIG. 14 is a top plan view of a internal portion of the keyboard assembly of FIG. 12.

Turning to FIG. 14, depicted therein is a top plan view of a internal portion of keyboard assembly 40. Depicted implementation of side 40*a* is shown to include flexible hinge 40*a*3. Depicted implementation of base 40*e* is shown to include aperture 40*e*3, aperture 40*e*4, aperture 40*e*5, protrusion fluid diverter 40*e*6, protrusion fluid diverter 40*e*7, protrusion fluid diverter 40*e*8, protrusion fluid diverter 40*e*9, and protrusion fluid diverter 40*e*10. Depicted implementation of protrusion fluid diverter 40*e*6 is shown to include channel 40*e*6*a*, and channel 40*e*6*b*. Depicted implementation of protrusion fluid diverter 40*e*7 is shown to include channel 40*e*7*a*, and channel 40*e*7*b*. Depicted implementation of protrusion fluid diverter 40*e*8 is shown to include channel 40*e*8*a*, channel 40*e*8*b*, and channel 40*e*8*c*. Depicted implementation of protrusion fluid diverter 40*e*9 is shown to include channel 40*e*9*a* and channel 40*e*9*b*. Depicted implementation of protrusion fluid diverter 40*e* 10 is shown to include channel 40*e*10*a*.

Figure 15:
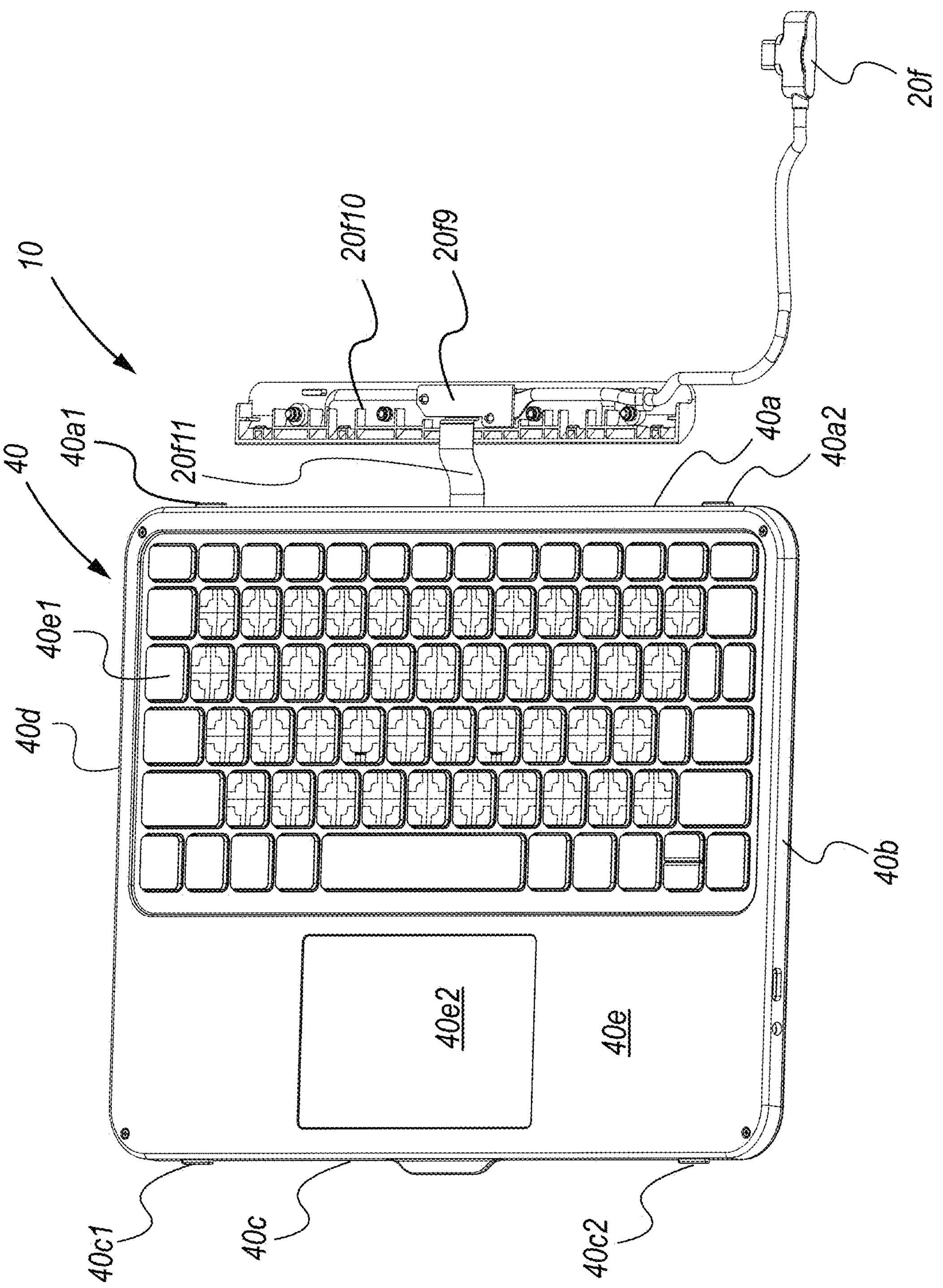
FIG. 15 is a top plan view of the keyboard assembly of FIG. 12 with the cable assembly of FIG. 11.

Turning to FIG. 15, depicted therein is a top plan view of keyboard assembly 40 electrically coupled with electrical cable assembly 20*f*. Depicted implementation of electrical cable assembly 20*f* is shown to include electrical cable portion 20*f*11 electrically coupled with keyboard assembly 40.

Figure 16:
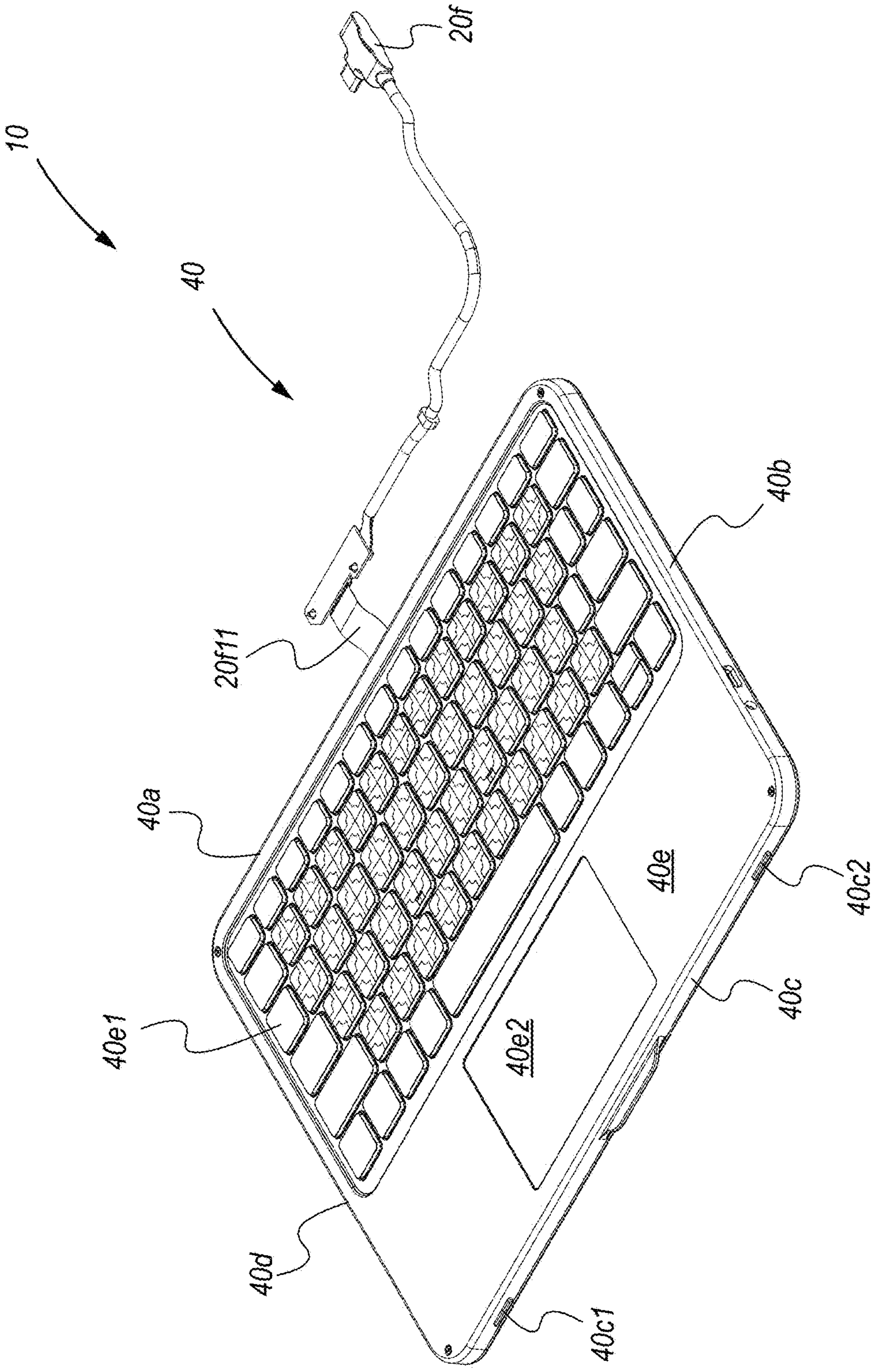
FIG. 16 is a front perspective view of the keyboard assembly of FIG. 12 with the cable assembly of FIG. 11.

Turning to FIG. 16, depicted therein is a front perspective view of keyboard assembly 40 electrically coupled with electrical cable assembly 20*f*.

Figure 17:
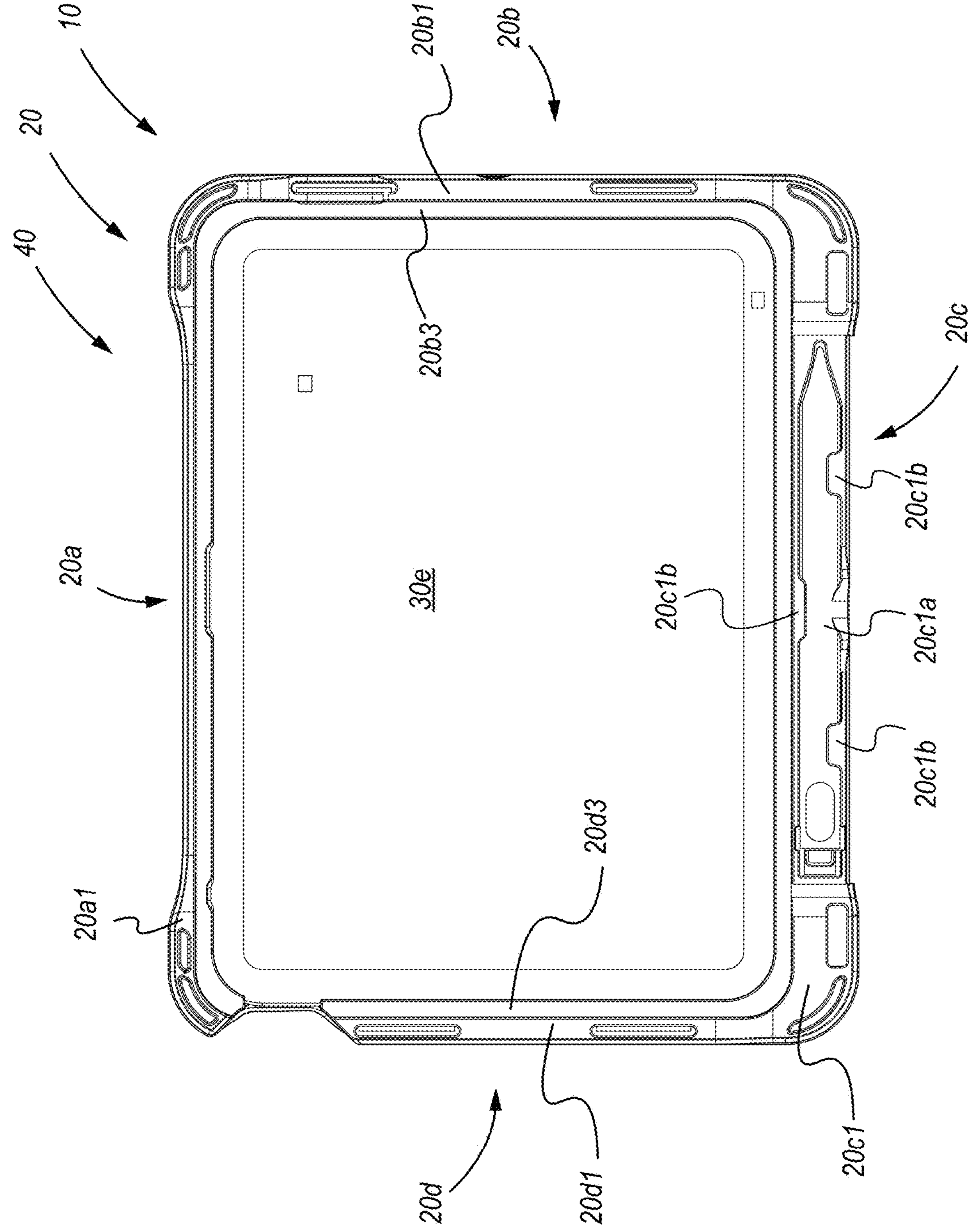
FIG. 17 is a top plan view of the portable electronic device of FIG. 9 coupled with the case assembly of FIG. 1.

Turning to FIG. 17, depicted therein is a top plan view of portable electronic device 30 coupled with case assembly 20. In implementations portable electronic device 30 is removable couplable with middle wall portion 20*a*4, middle wall portion 20*b*4, middle wall portion 20*c*4, and middle wall portion 20*d*4 of case assembly 20.

Figure 18:
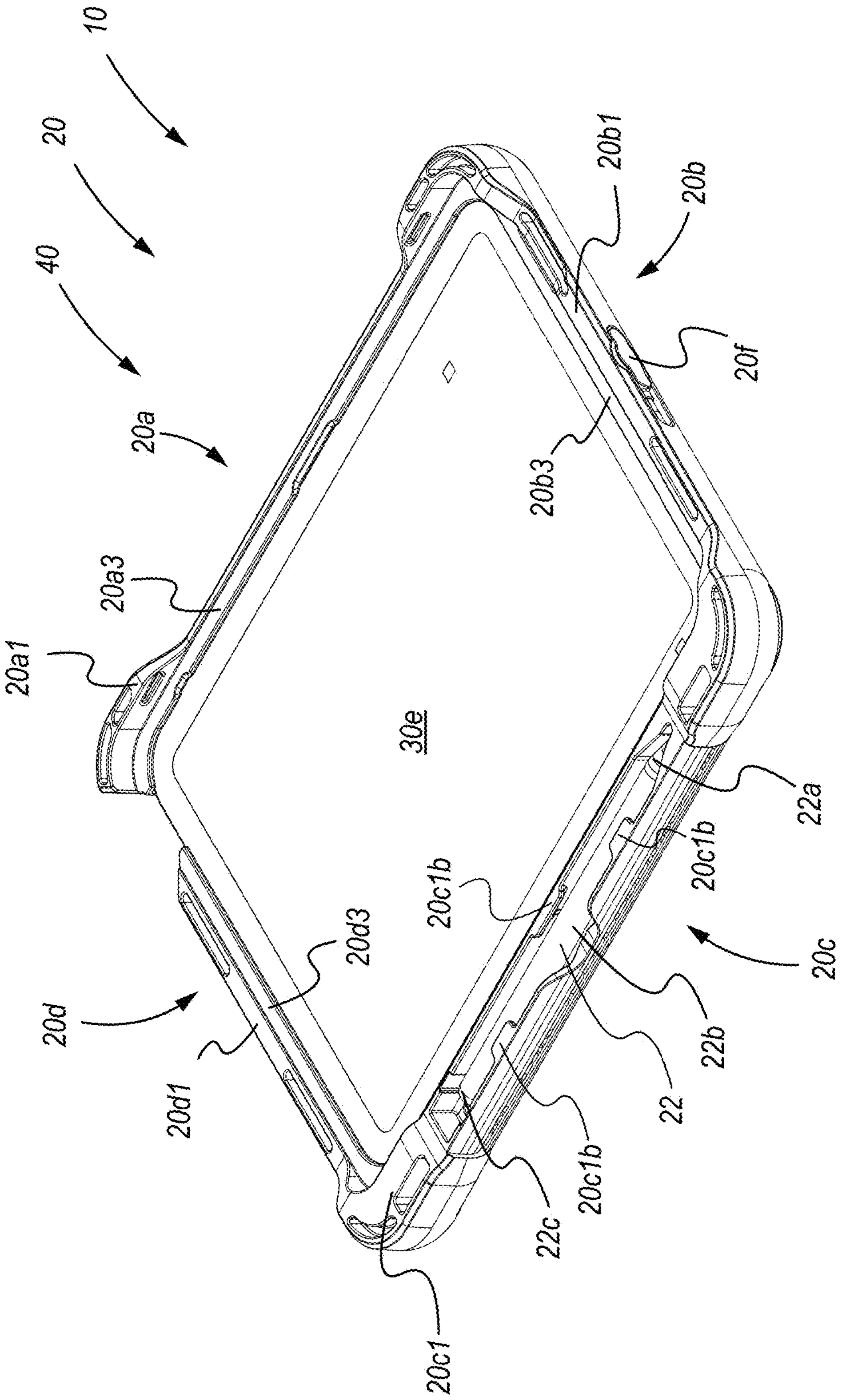
FIG. 18 is a front perspective view of the portable electronic device of FIG. 9 coupled with the case assembly of FIG. 1.

Turning to FIG. 18, depicted therein is a front perspective view of portable electronic device 30 coupled with case assembly 20.

Figure 19:
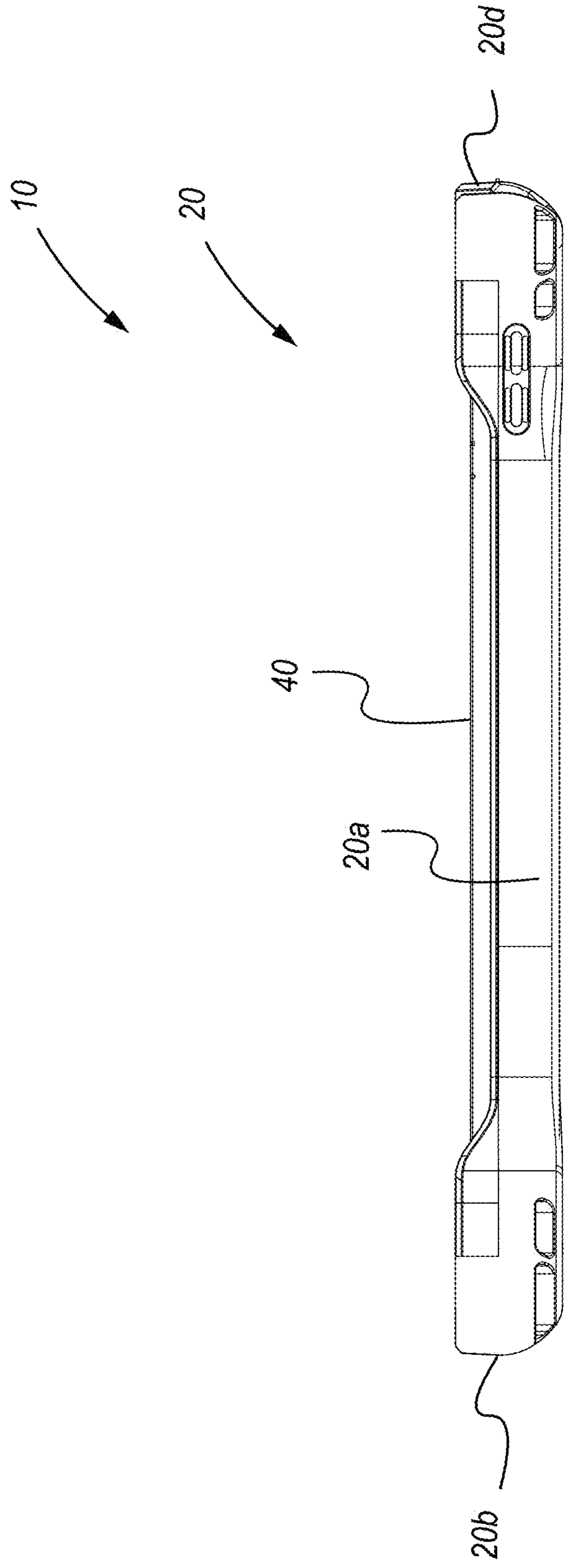
FIG. 19 is a front perspective view of the keyboard assembly of FIG. 12 coupled with the case assembly of FIG. 1.

Turning to FIG. 19, depicted therein is a front perspective view of keyboard assembly 40 coupled with case assembly 20.

Figure 20:
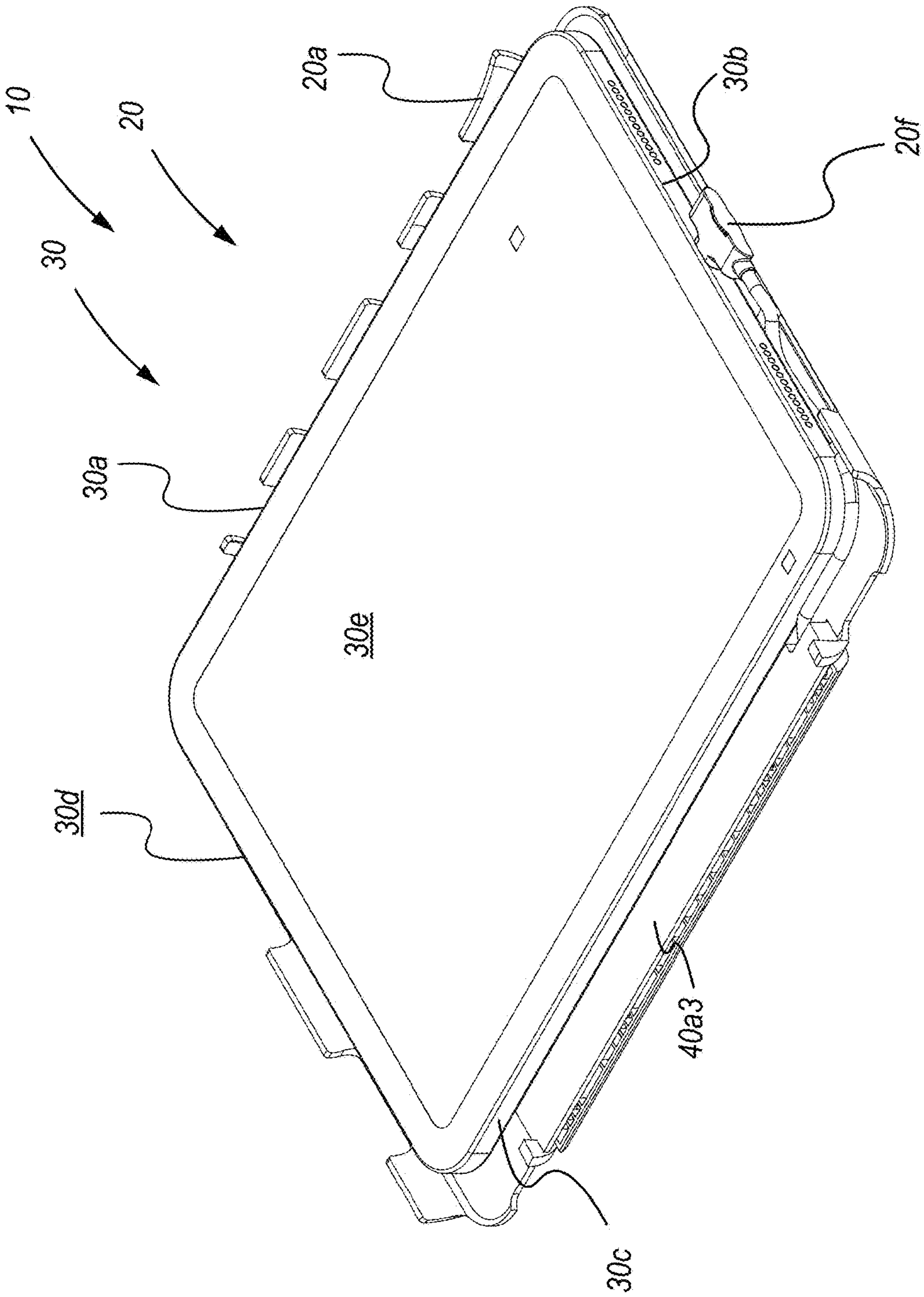
FIG. 20 is a front perspective view of the portable electronic device of FIG. 9 coupled with a portion of the case assembly of FIG. 1 and the cable assembly of FIG. 11.

Turning to FIG. 20, depicted therein is a front perspective view of portable electronic device 30 coupled with a portion of case assembly 20 and electrical cable assembly 20*f*.

Figure 21:
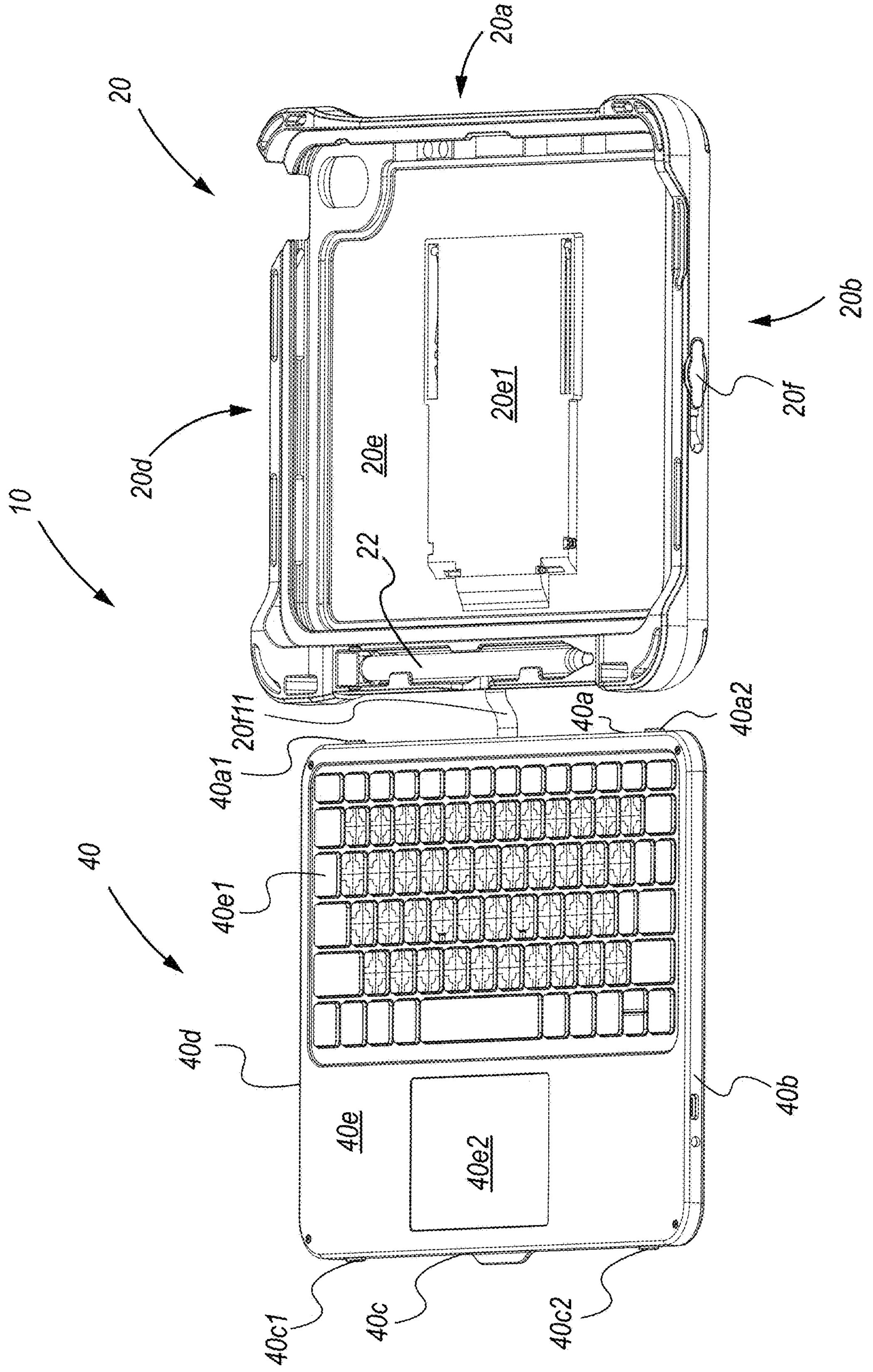
FIG. 21 is a front perspective view of the keyboard assembly of FIG. 12 and the case assembly of FIG. 1 both coupled with the cable assembly of FIG. 11.

Turning to FIG. 21, depicted therein is a front perspective view of keyboard assembly 40 and case assembly 20 both coupled with electrical cable assembly 20*f*.

Figure 22:
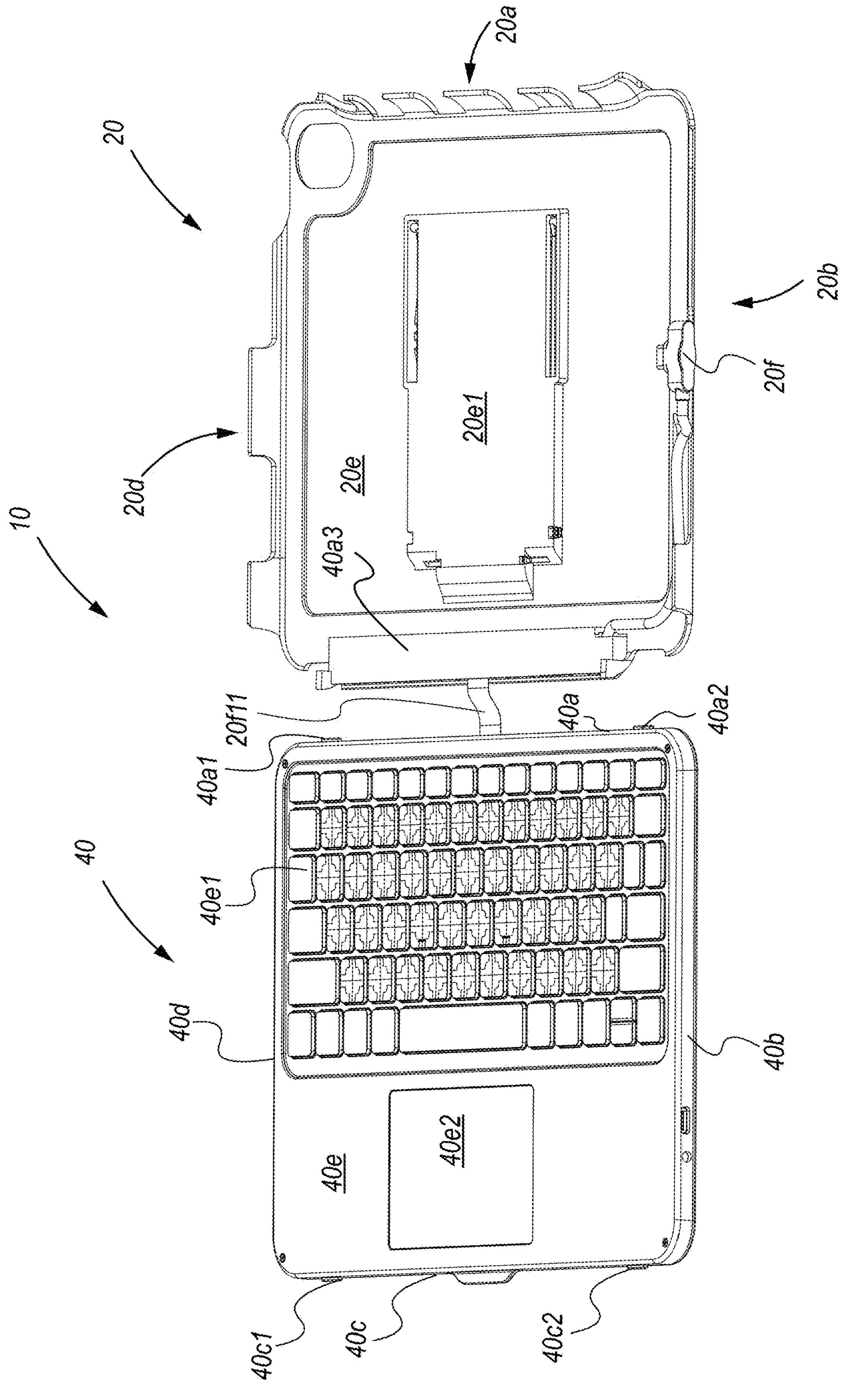
FIG. 22 is a front perspective view of the keyboard assembly of FIG. 12 and a portion of the case assembly of FIG. 1 both coupled with the cable assembly of FIG. 11.

Turning to FIG. 22, depicted therein is a front perspective view of keyboard assembly 40 and a portion of case assembly 20 both coupled with electrical cable assembly 20*f*.

Figure 23:
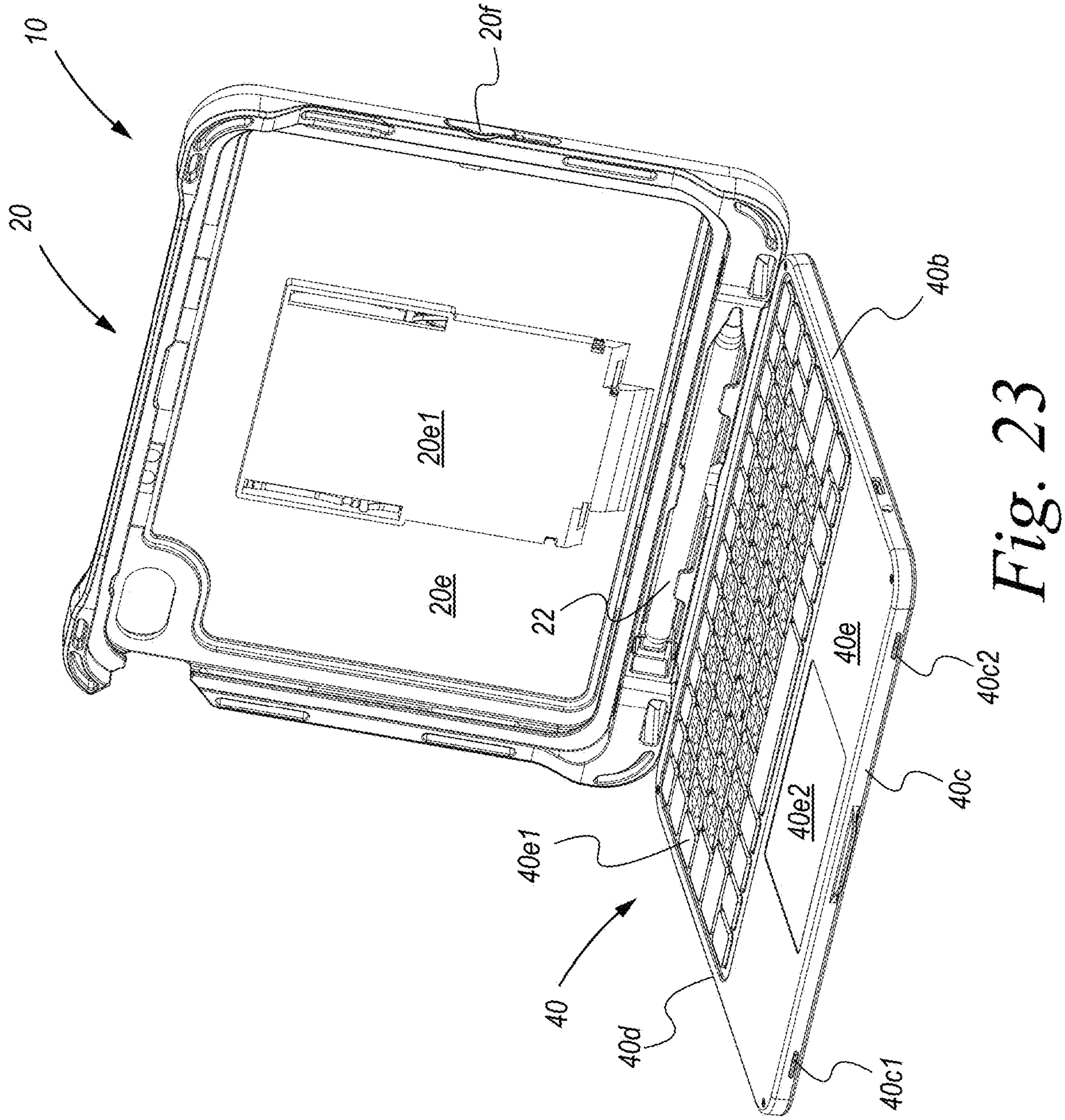
FIG. 23 is a front perspective view of the keyboard assembly of FIG. 12 coupled with the case assembly of FIG. 1.

Turning to FIG. 23, depicted therein is a front perspective view of keyboard assembly 40 coupled with case assembly 20.

Figure 24:
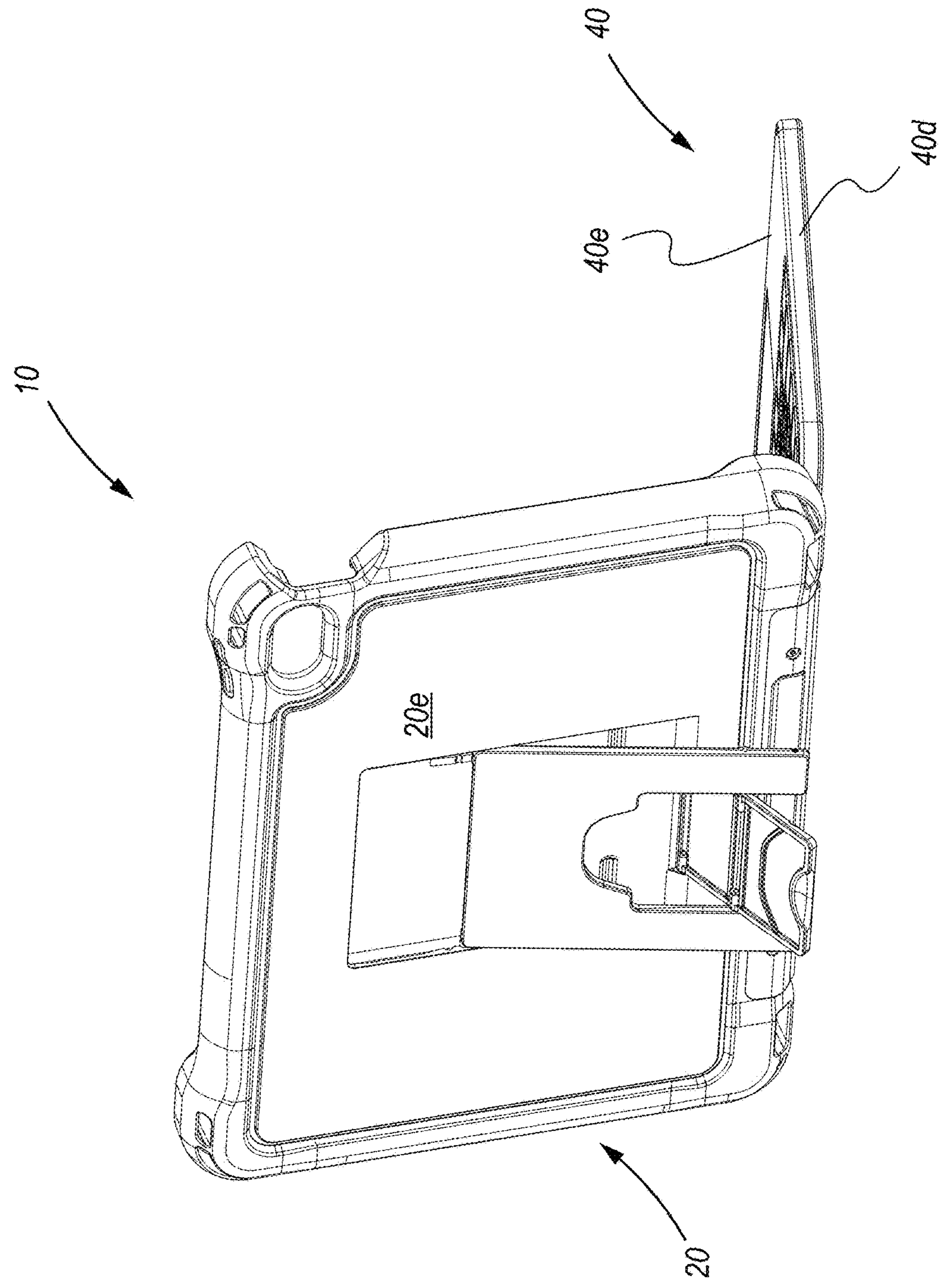
FIG. 24 is a rear perspective view of the keyboard assembly of FIG. 12 coupled with the case assembly of FIG. 1.

Turning to FIG. 24, depicted therein is a rear perspective view of keyboard assembly 40 coupled with case assembly 20.

Figure 25:
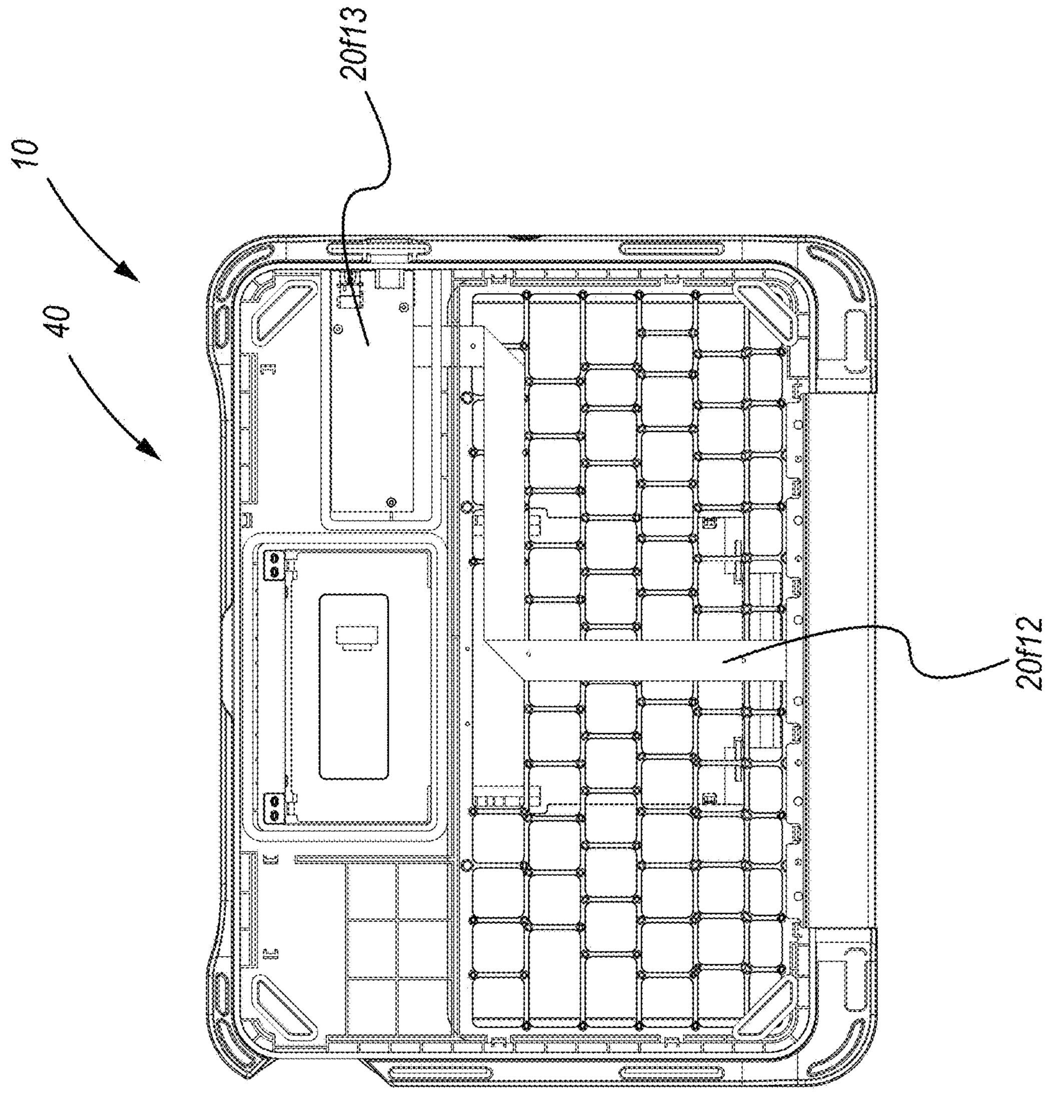
FIG. 25 is a top plan view of an internal portion of the keyboard assembly of FIG. 12 coupled with a portion of the cable assembly of FIG. 11.

Turning to FIG. 25, depicted therein is a top plan view of an internal portion of keyboard assembly 40 electrically coupled with a portion of electrical cable assembly 20*f*. Depicted implementation of electrical cable assembly 20*f* is shown to include electrical cable portion 20*f*12 and keyboard controller portion 20*f*13.

Figure 26:
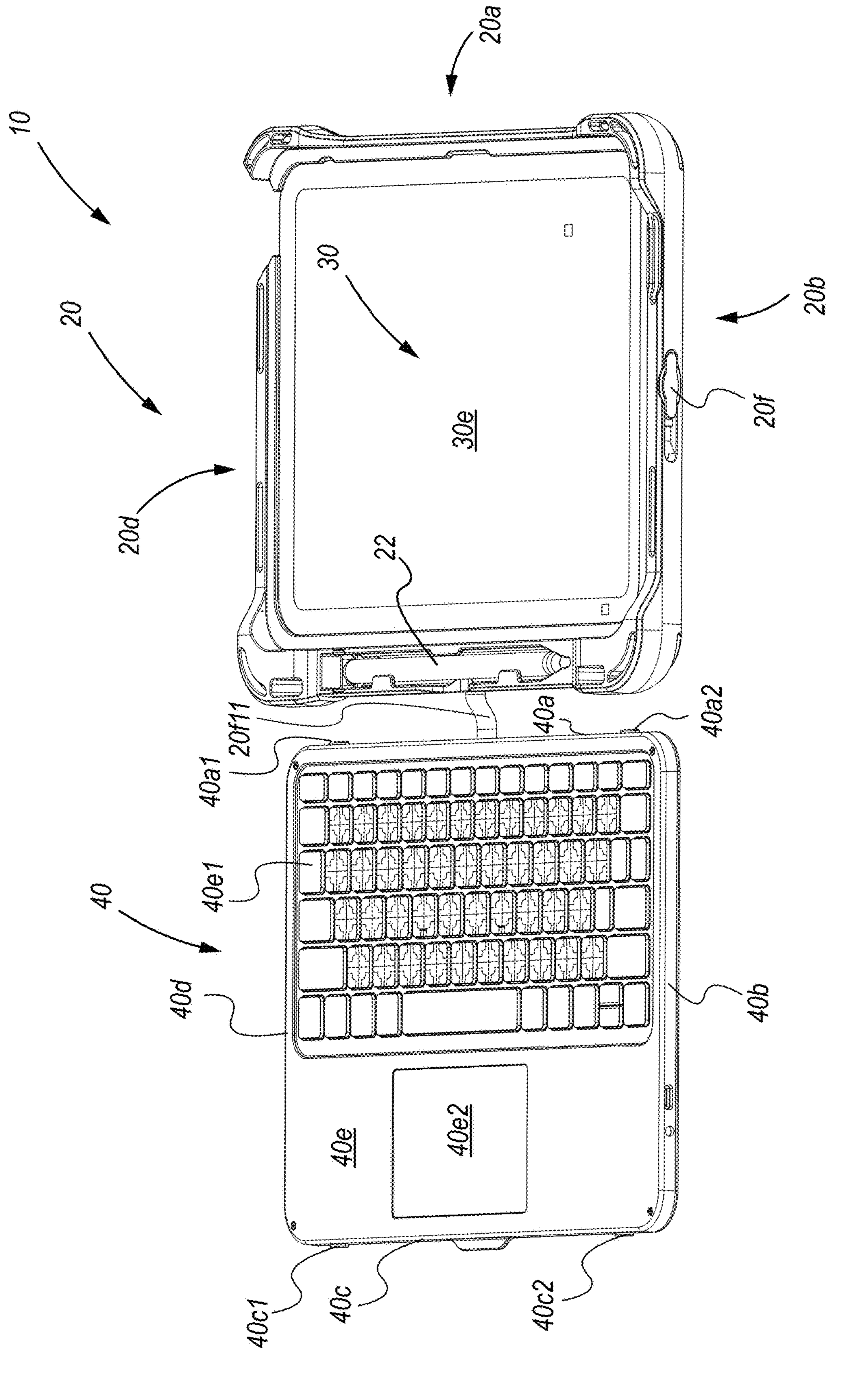
FIG. 26 is a front perspective view of the keyboard assembly of FIG. 12 and the case assembly of FIG. 1 coupled with the portable electronic device of FIG. 9 with all coupled with the cable assembly of FIG. 11.

Turning to FIG. 26, depicted therein is a front perspective view of keyboard assembly 40 and case assembly 20 coupled with portable electronic device 30 and all coupled with electrical cable assembly 20*f*.

Figure 27:
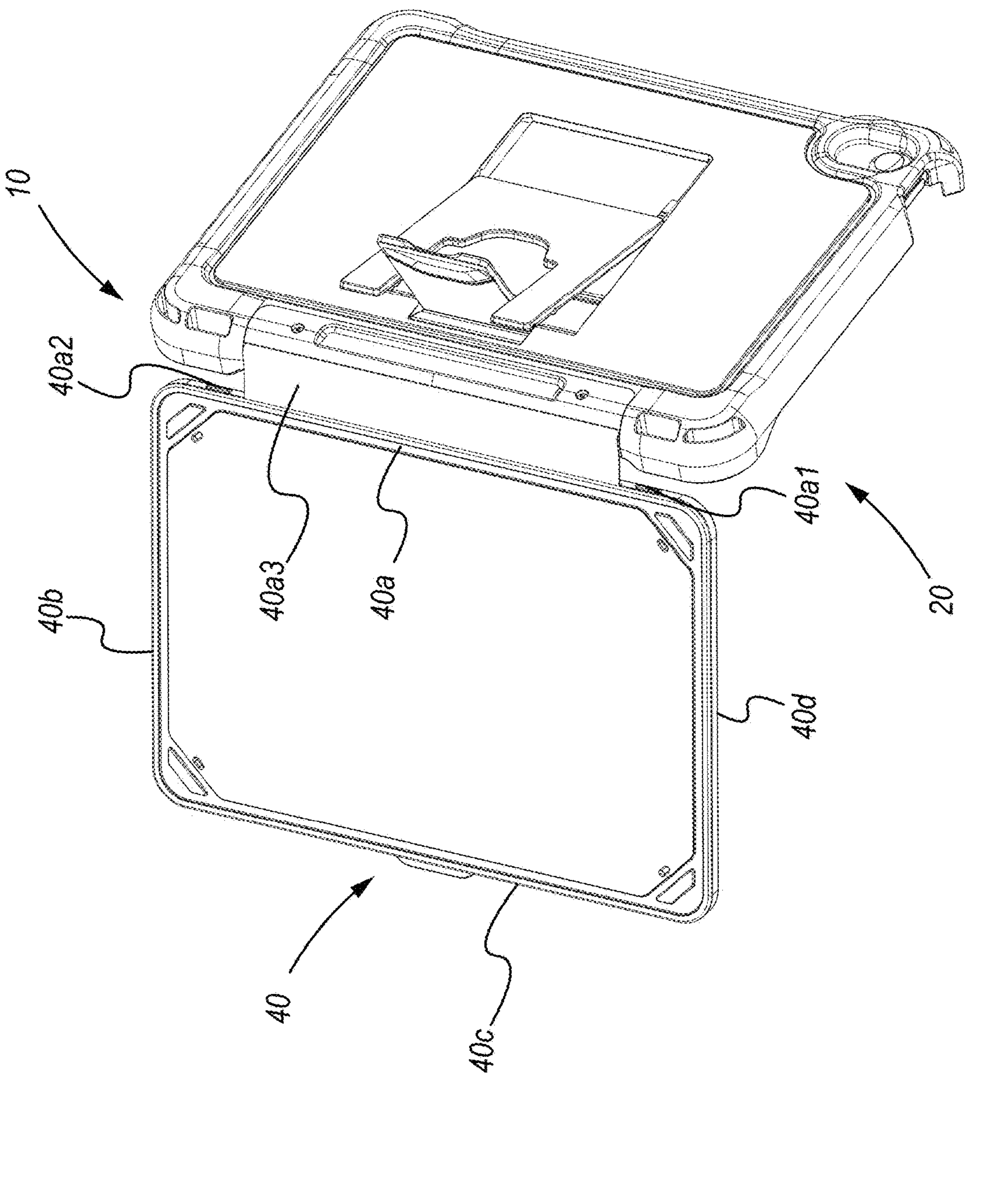
FIG. 27 is a bottom perspective view of the keyboard assembly of FIG. 12 coupled with the case assembly of FIG. 1.

Turning to FIG. 27, depicted therein is a bottom perspective view of keyboard assembly 40 coupled with case assembly 20. As shown, flexible hinge 40*a*3 is coupled with case assembly 20 and can cover electrical cable portion 20*f*11.

Figure 28:
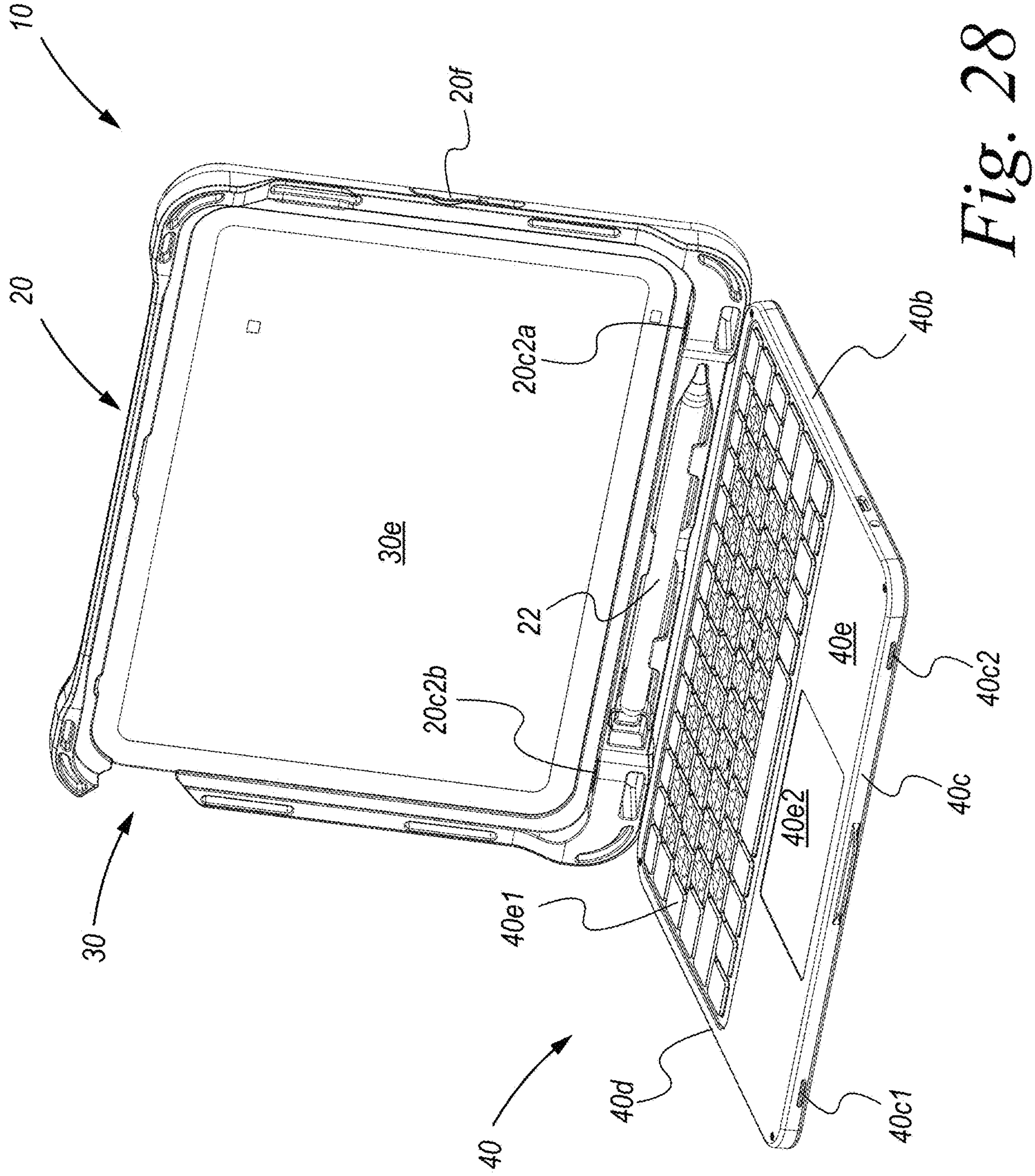
FIG. 28 is a front perspective view of the keyboard assembly of FIG. 12 coupled with the case assembly of FIG. 1 coupled with the portable electronic device of FIG. 9.

Turning to FIG. 28, depicted therein is a front perspective view of keyboard assembly 40 coupled with case assembly 20 coupled with portable electronic device 30.

Figure 29:
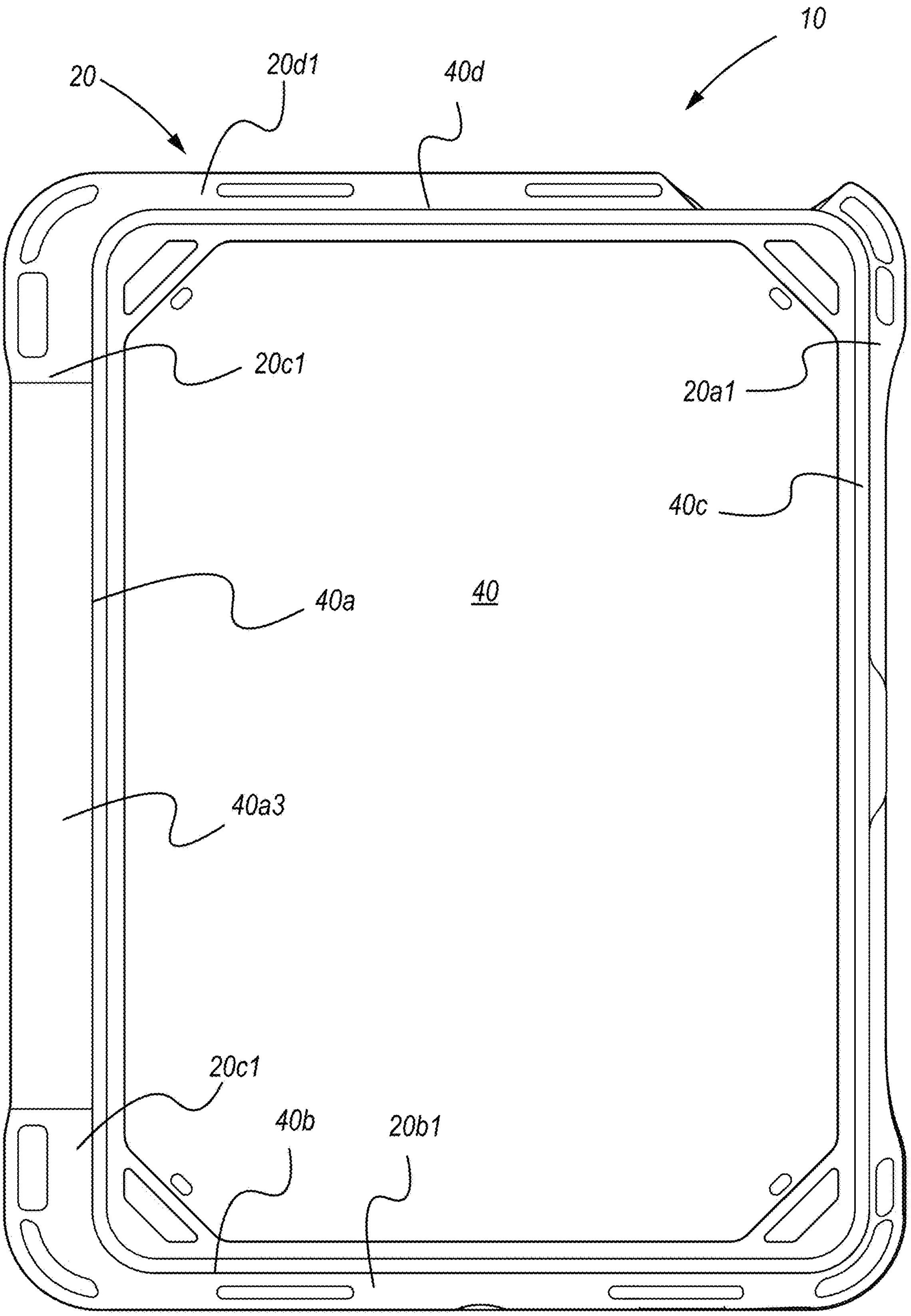
FIG. 29 is a top plan view of the keyboard assembly of FIG. 12 coupled with the case assembly of FIG. 1.

Turning to FIG. 29, depicted therein is a top plan view of the keyboard assembly of FIG. 12 coupled with the case assembly of FIG. 1.

Figure 30:
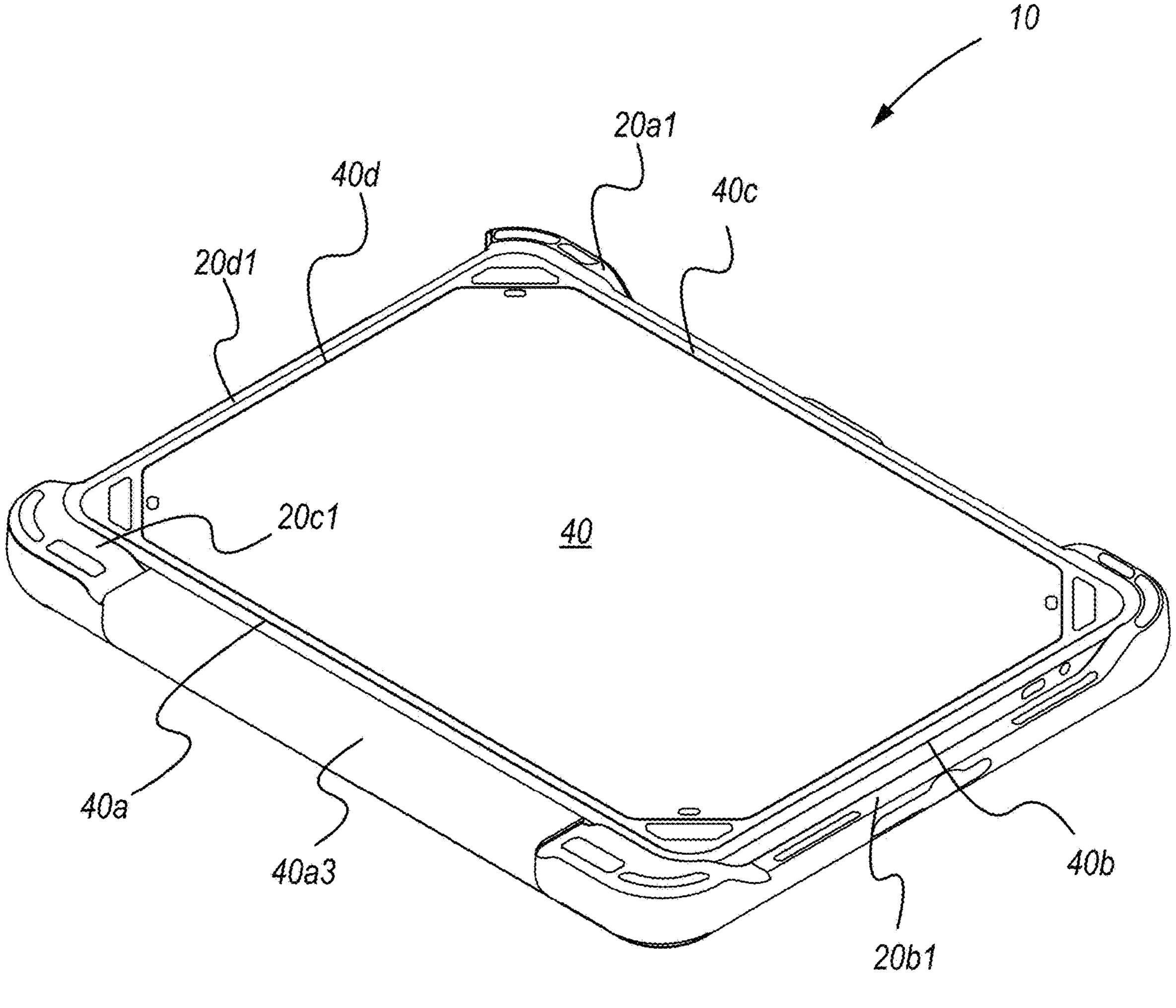
FIG. 30 is a front perspective view of the keyboard assembly of FIG. 12 coupled with the case assembly of FIG. 1.

Turning to FIG. 30, depicted therein is a front perspective view of the keyboard assembly of FIG. 12 coupled with the case assembly of FIG. 1.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic device, the system comprising:

(I) a case assembly including (A) a base, (B) a first side extending perpendicular to the base, the first side including at least one distal wall portion, at least one middle wall portion, and at least one proximal wall portion, wherein the at least one distal wall portion is farther from the base than the at least one proximal wall portion is from the base, wherein the at least one middle wall portion is between the at least one distal wall portion and the at least one proximal wall portion, wherein the first side includes at least one keyboard support portion extending perpendicular to the at least one distal wall portion of the first side, wherein the first side includes at least one portable electronic device support portion extending perpendicular to the at least one middle wall portion of the first side, and wherein the at least one keyboard support portion of the first side is closer to the at least one distal wall portion of the first side than the at least one portable electronic device support portion of the first side is to the at least one distal wall portion of the first side, (C) a second side extending perpendicular to the base and extending perpendicular to the first side, (D) a third side extending perpendicular to the base and extending perpendicular to the second side, the third side including at least one distal wall portion, at least one middle wall portion, and at least one proximal wall portion, wherein the at least one distal wall portion is farther from the base than the at least one proximal wall portion is from the base, wherein the at least one middle wall portion is between the at least one distal wall portion and the at least one proximal wall portion, wherein the third side includes at least one keyboard support portion extending perpendicular to the at least one distal wall portion of the third side, wherein the third side includes at least one portable electronic device support portion extending perpendicular to the at least one middle wall portion of the third side, and wherein the at least one keyboard support portion of the third side is closer to the at least one distal wall portion of the third side than the at least one portable electronic device support portion of the third side is to the at least one distal wall portion of the third side, and (E) a fourth side extending perpendicular to the base and extending perpendicular to the first side; and (II) a keyboard assembly including (A) a base, (B) a first side extending perpendicular to the base, wherein the first side of the keyboard assembly includes at least one protrusion, wherein the at least one distal wall portion of the first side of the case assembly includes at least one protrusion, and wherein the at least one protrusion of the first side of the keyboard assembly is removably couplable with the at least one protrusion of the at least one distal wall portion of the first side of the case assembly, (C) a second side extending perpendicular to the base and extending perpendicular to the first side, (D) a third side extending perpendicular to the base and extending perpendicular to the second side, wherein the third side of the keyboard assembly includes at least one protrusion, wherein the at least one distal wall portion of the third side of the case assembly includes at least one protrusion, and wherein the at least one protrusion of the third side of the keyboard assembly is removably couplable with the at least one protrusion of the at least one distal wall portion of the third side of the case assembly, and (E) a fourth side extending perpendicular to the base and extending perpendicular to the first side.

2. The system of claim 1, wherein the at least one keyboard support portion of the first side is a flexible material, and wherein the at least one keyboard support portion of the third side is a flexible material.

3. The system of claim 1, wherein the at least one middle wall portion of the first side is removably couplable with the portable electronic device, and wherein the at least one middle wall portion of the third side is removably couplable with the portable electronic device.

4. The system of claim 1, wherein the case assembly includes at least one semi-rigid portion to allow for uncoupling of the portable electronic device from the case assembly when the portable electronic device is coupled to the case assembly.

5. The system of claim 1, wherein the second side of the case assembly includes an interior portion and an exterior portion, wherein the case assembly includes an electrical cable assembly, wherein the electrical cable assembly includes an electrical connector assembly, wherein the second side of the case assembly includes an aperture from the exterior portion of the second side through the second side to the interior portion of the second side, wherein the electrical cable assembly extends from the exterior portion of the second side through the aperture of the second side to extend beyond the interior portion of the second side, wherein a portion of the electrical cable assembly extends along the exterior portion of the second side, wherein a portion of the electrical cable assembly extends along the interior portion of the second side, wherein the third side of the case assembly includes an interior portion, wherein a portion of the electrical cable assembly extends along the interior portion of the third side, and wherein the electrical cable assembly is electrically coupled to the keyboard assembly.

6. The system of claim 1, wherein the third side of the case assembly includes an exterior portion with a stylus-shaped recess, wherein the third side of the case assembly includes an exterior portion with a stylus-shaped recess sized to receive a stylus.

7. The system of claim 1, further including a flexible hinge, wherein the flexible hinge is coupled to the case assembly, and wherein the flexible hinge is coupled to the keyboard assembly.

8. A system for a portable electronic device, the system comprising:

(I) a case assembly including (A) a base, (B) a first side extending perpendicular to the base, the first side including at least one distal wall portion, and at least one proximal wall portion, and wherein the at least one distal wall portion is farther from the base than the at least one proximal wall portion is from the base, wherein the first side includes at least one keyboard support portion and at least one portable electronic device support portion, wherein the at least one keyboard support portion of the first side extends perpendicular to the at least one distal wall portion of the first side wherein the at least one portable electronic device support portion of the first side extends perpendicular to the at least one distal wall portion of the first side, and wherein the at least one keyboard support portion of the first side is closer to the at least one distal wall portion of the first side than the at least one portable electronic device support portion of the first side is to the at least one distal wall portion of the first side, and (C) a second side extending perpendicular to the base and extending parallel with the first side, the second side including at least one distal wall portion, and at least one proximal wall portion, wherein the at least one distal wall portion is farther from the base than the at least one proximal wall portion is from the base, wherein the second side includes at least one keyboard support portion and at least one portable electronic device support portion, wherein the at least one keyboard support portion of the second side extends perpendicular to the at least one distal wall portion of the second side, wherein the at least one portable electronic device support portion of the second side extends perpendicular to the at least one distal wall portion of the second side, and wherein the at least one keyboard support portion of the second side is closer to the at least one distal wall portion of the second side than the at least one portable electronic device support portion of the second side is to the at least one distal wall portion of the second side; and (II) a keyboard assembly including
(A) a base,
(B) a first side extending perpendicular to the base,
wherein the first side of the keyboard assembly includes at least one protrusion,
wherein the at least one distal wall portion of the first side of the case assembly includes at least one protrusion, and
wherein the at least one protrusion of the first side of the keyboard assembly is removably couplable with the at least one protrusion of the at least one distal wall portion of the first side of the case assembly, and
(C) a second side extending perpendicular to the base and extending parallel with the first side,
wherein the second side of the keyboard assembly includes at least one protrusion,
wherein the at least one distal wall portion of the second side of the case assembly includes at least one protrusion, and
wherein the at least one protrusion of the second side of the keyboard assembly is removably couplable with the at least one protrusion of the at least one distal wall portion of the second side of the case assembly.

9. The system of claim 8,
wherein the at least one keyboard support portion of the first side is a flexible material, and
wherein the at least one keyboard support portion of the second side is a flexible material.

* * * * *